(12) United States Patent
Kim et al.

(10) Patent No.: US 11,789,547 B2
(45) Date of Patent: Oct. 17, 2023

(54) DISPLAY APPARATUS

(71) Applicant: LG ELECTRONICS INC., Seoul (KR)

(72) Inventors: Jayoen Kim, Seoul (KR); Myongsun Kim, Seoul (KR); Jungho Yeom, Seoul (KR); Joohyeon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/967,027

(22) PCT Filed: Mar. 23, 2018

(86) PCT No.: PCT/KR2018/003432
§ 371 (c)(1),
(2) Date: Aug. 3, 2020

(87) PCT Pub. No.: WO2019/151570
PCT Pub. Date: Aug. 8, 2019

(65) Prior Publication Data
US 2021/0041960 A1    Feb. 11, 2021

(30) Foreign Application Priority Data
Feb. 5, 2018   (KR) .......... 10-2018-0014163

(51) Int. Cl.
*G06F 3/0346* (2013.01)
*G06F 3/0488* (2022.01)
(Continued)

(52) U.S. Cl.
CPC .......... *G06F 3/0346* (2013.01); *G06F 3/0488* (2013.01); *G06F 3/04845* (2013.01)

(58) Field of Classification Search
CPC .. G06F 3/0346; G06F 3/04845; G06F 3/0488; G06F 3/04886; G06F 3/04842; G06F 3/0418; G06F 3/04812; G11B 27/34; H04N 21/482; H04N 21/478; H04N 21/4221
See application file for complete search history.

(56) References Cited

U.S. PATENT DOCUMENTS 8,756,502 B2 * 6/2014 Hill ...................... G06F 3/04817
715/810
2004/0233239 A1 * 11/2004 Lahdesmaki .......... H04N 21/47
715/810

(Continued)

FOREIGN PATENT DOCUMENTS

EP         3098740 A1 * 11/2016  .......... G06F 19/321
JP       2010-204810 A    9/2010
(Continued)

*Primary Examiner* — Lixi C Simpson
(74) *Attorney, Agent, or Firm* — Birch, Stewart, Kolasch & Birch, LLP

(57) ABSTRACT

A display apparatus is disclosed. A display apparatus according to an embodiment of the present invention comprises: a display to display a pointer; a user input interface unit to receive a user input to move the pointer; and a controller to move the pointer while fixing the pointer in a specific direction, when real coordinates of the pointer, which are matched to the user input, are positioned in a menu region and when the user input to move the pointer is received.

21 Claims, 42 Drawing Sheets

(51) Int. Cl.
   *G06F 3/0484* (2022.01)
   *G06F 3/04845* (2022.01)

(56) References Cited

U.S. PATENT DOCUMENTS

| | | | |
|---|---|---|---|
| 2007/0085830 A1 | 4/2007 | Yoo et al. | |
| 2009/0309830 A1* | 12/2009 | Yamamoto | G06F 3/04845 |
| | | | 345/156 |
| 2010/0169839 A1* | 7/2010 | Yoo | G06F 3/04812 |
| | | | 715/856 |
| 2012/0060088 A1* | 3/2012 | Hill | G06F 3/0481 |
| | | | 715/702 |
| 2013/0162533 A1 | 6/2013 | Kim | |
| 2014/0016040 A1 | 1/2014 | Motoyama et al. | |
| 2014/0115538 A1 | 4/2014 | Kim et al. | |
| 2014/0195957 A1 | 7/2014 | Bang | |
| 2014/0240225 A1* | 8/2014 | Eilat | G06F 3/011 |
| | | | 345/156 |
| 2015/0095845 A1* | 4/2015 | Chun | G06F 3/04883 |
| | | | 715/784 |
| 2016/0231831 A1 | 8/2016 | Nikura et al. | |
| 2017/0083204 A1* | 3/2017 | Kim | G06F 3/04892 |

FOREIGN PATENT DOCUMENTS

| | | |
|---|---|---|
| JP | 2015-225547 A | 12/2015 |
| KR | 10-2007-0042344 A | 4/2007 |
| KR | 10-2009-0015284 A | 2/2009 |
| KR | 10-2010-0028012 A | 3/2010 |
| KR | 10-2010-0078366 A | 7/2010 |
| KR | 10-1370834 B1 | 3/2014 |
| KR | 10-2014-0090074 A | 7/2014 |
| KR | 10-2015-0102272 A | 9/2015 |
| KR | 10-2016-0084146 A | 7/2016 |

* cited by examiner

FIG. 5
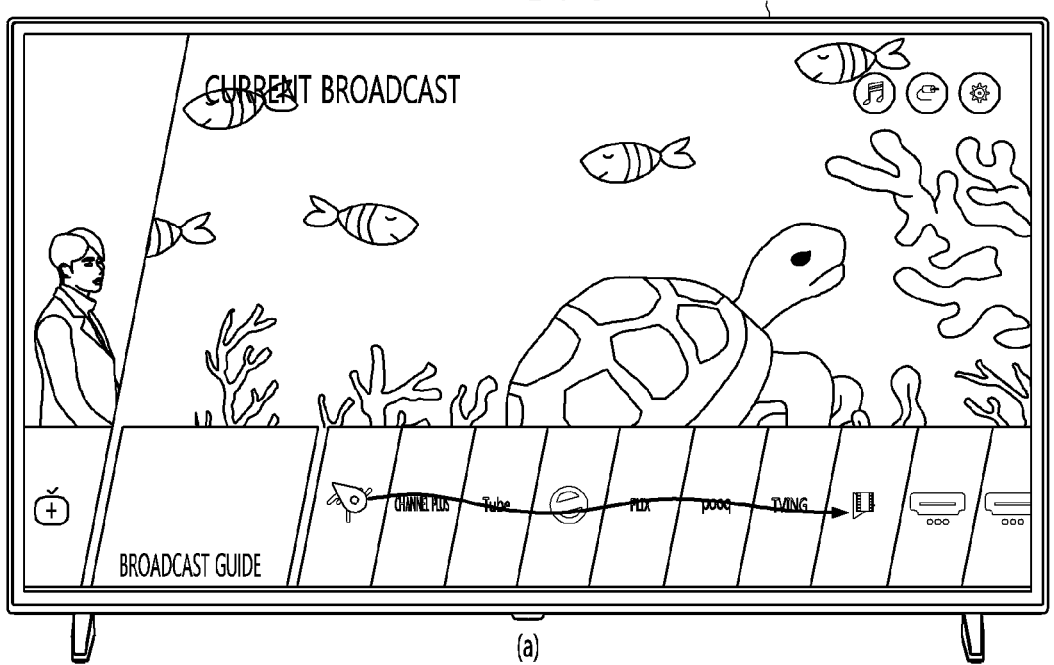
(a)
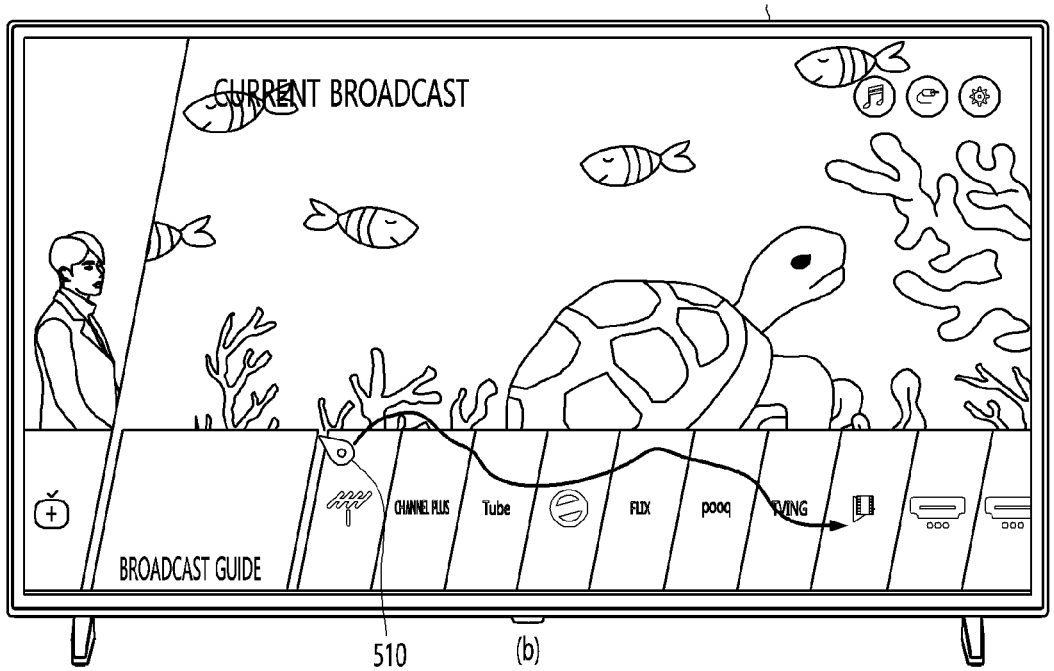
(b)

FIG. 9
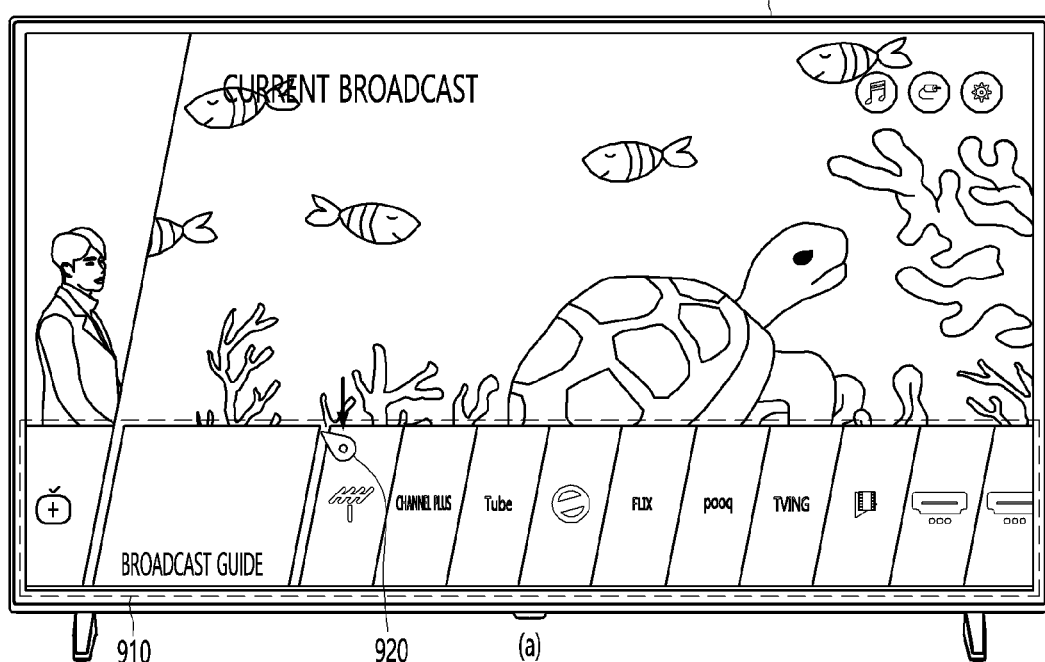
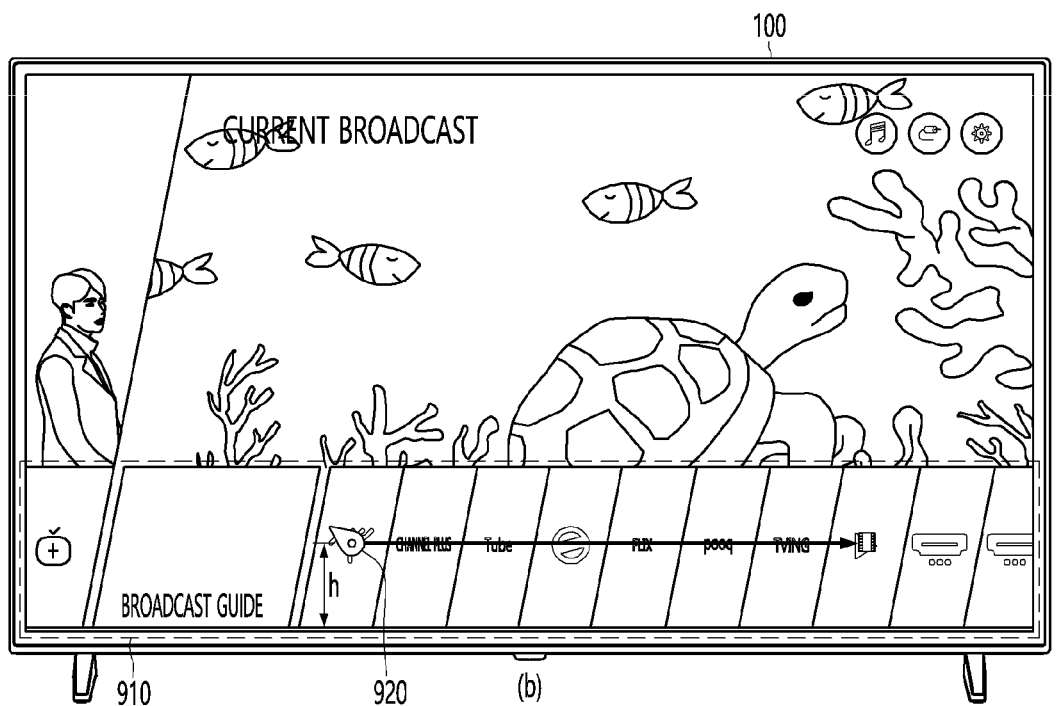

FIG. 10
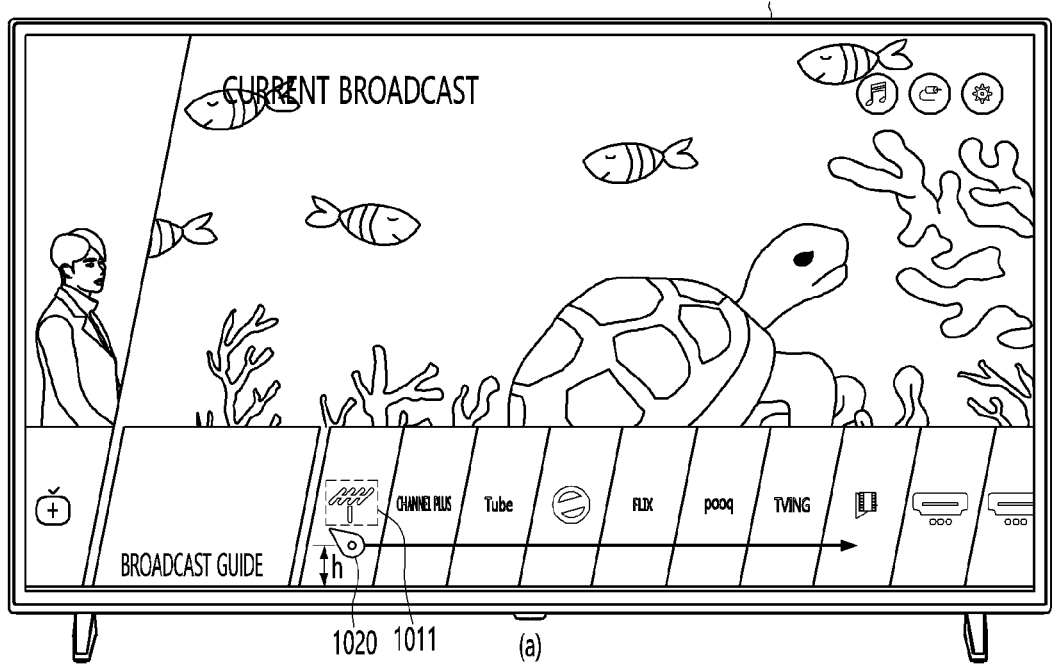
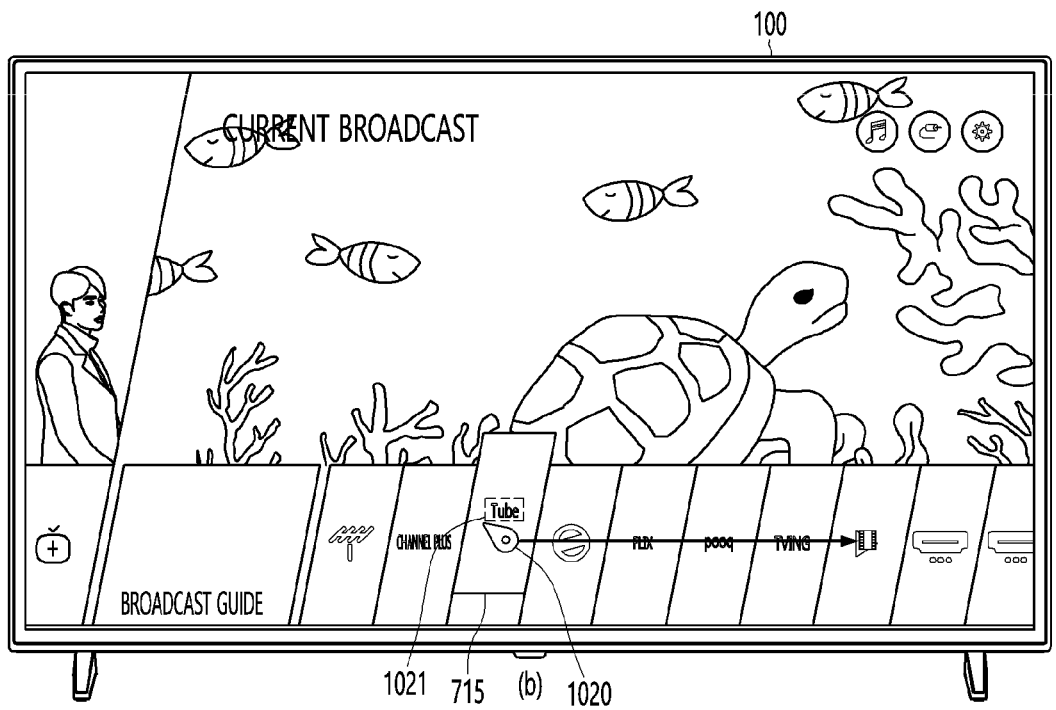

FIG. 14
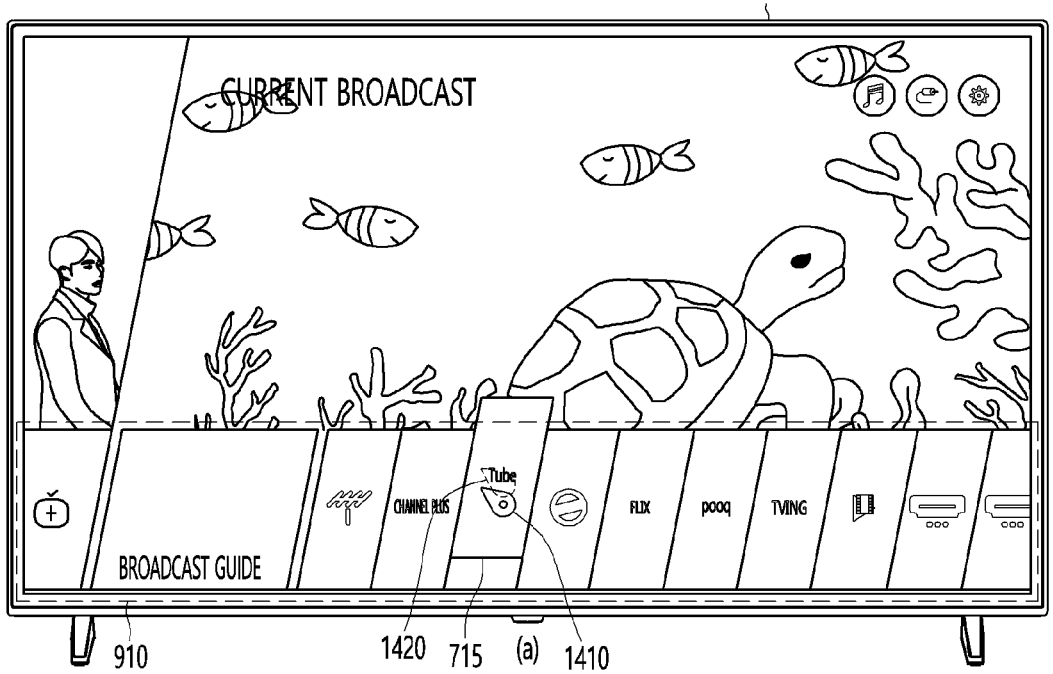
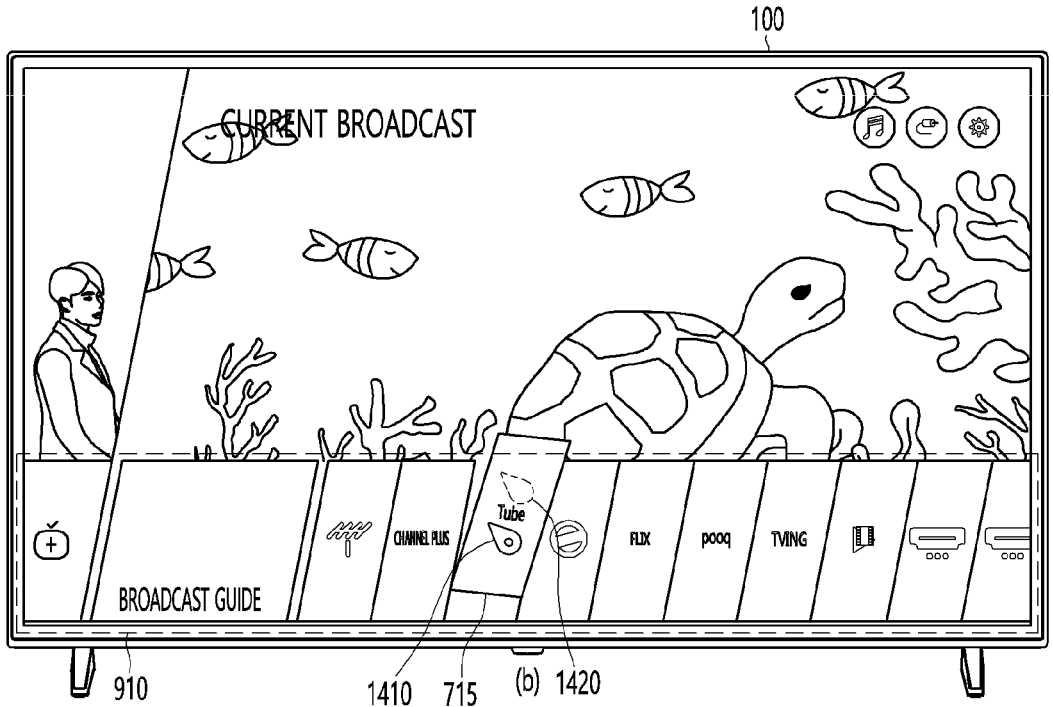

FIG. 15
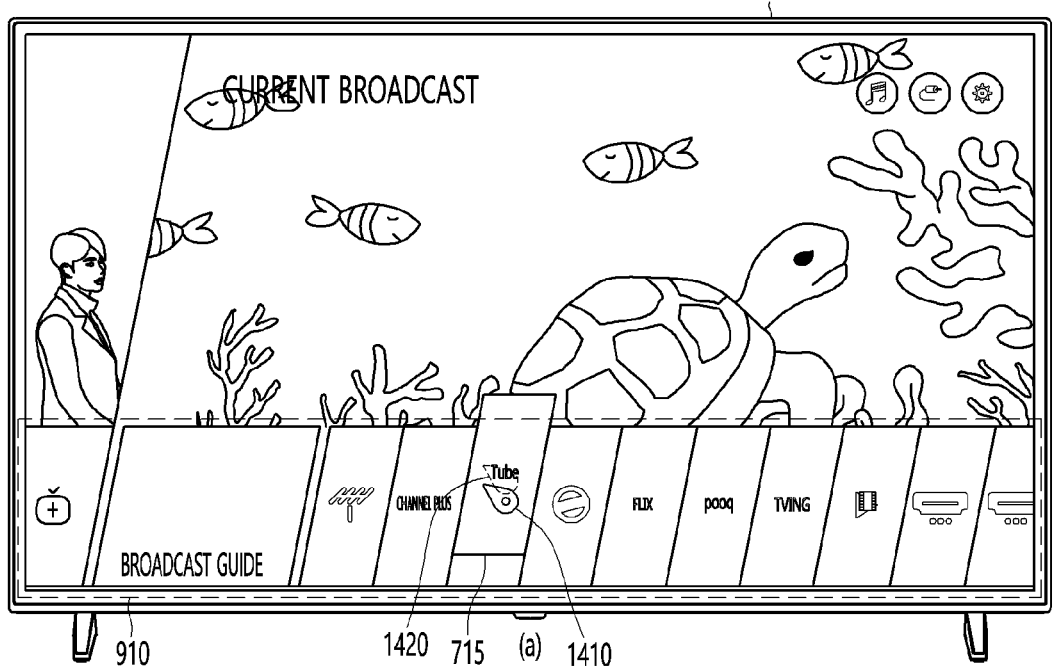
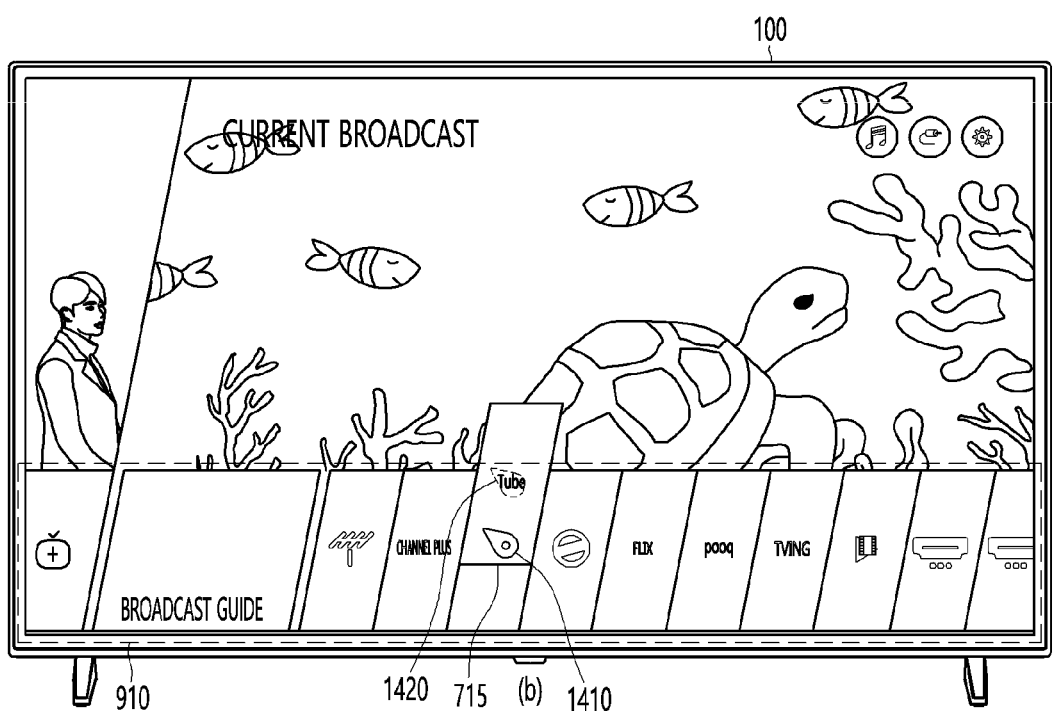

FIG. 16
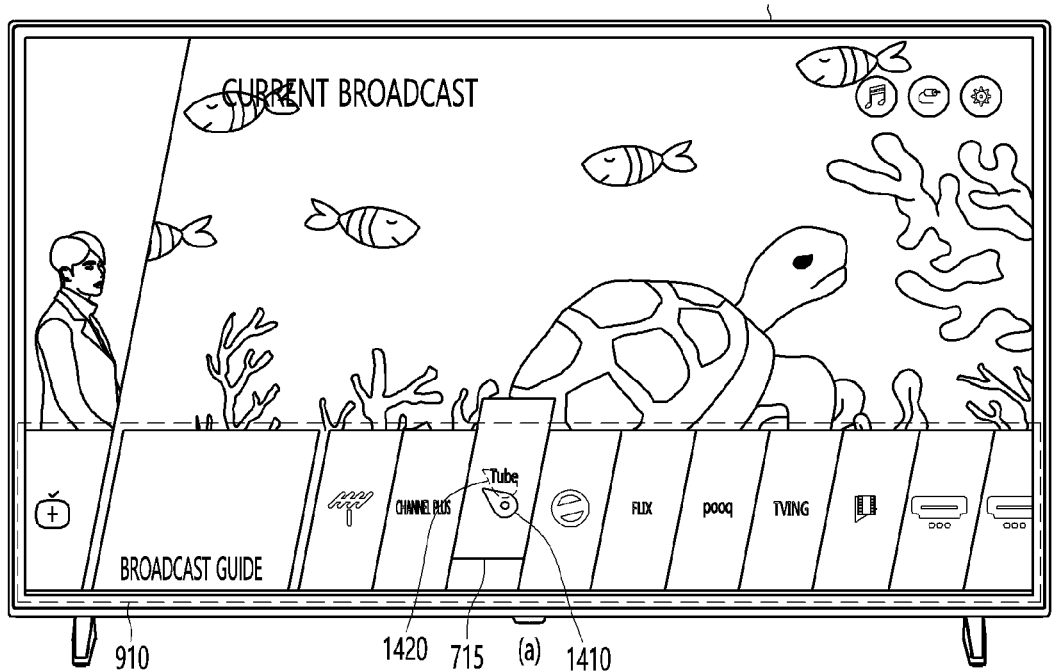
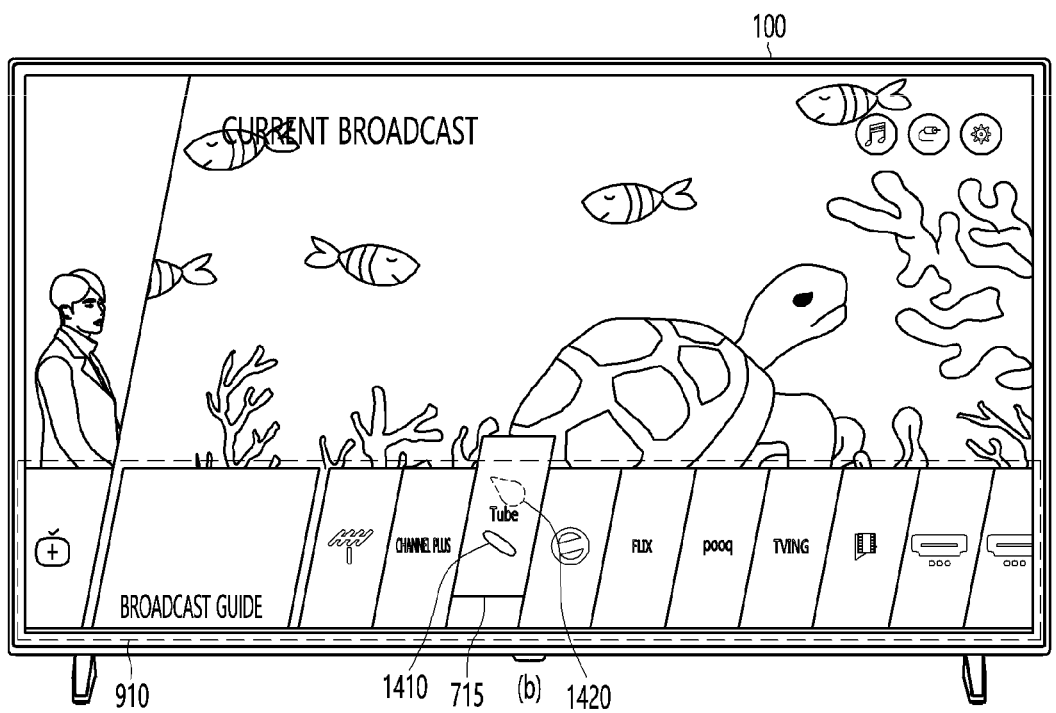

FIG. 17
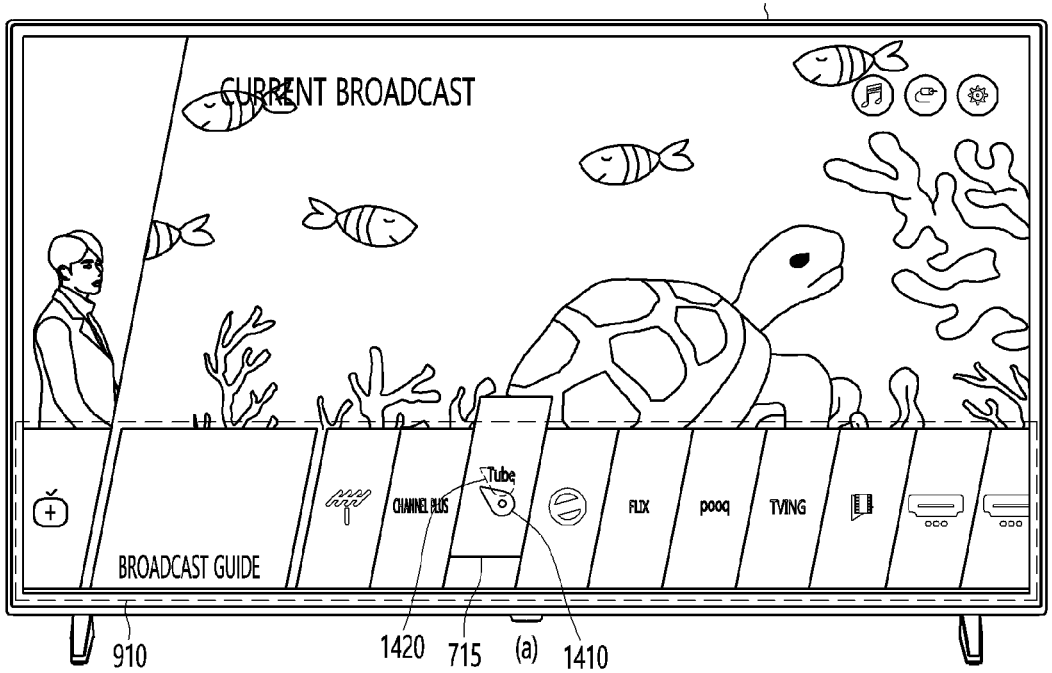
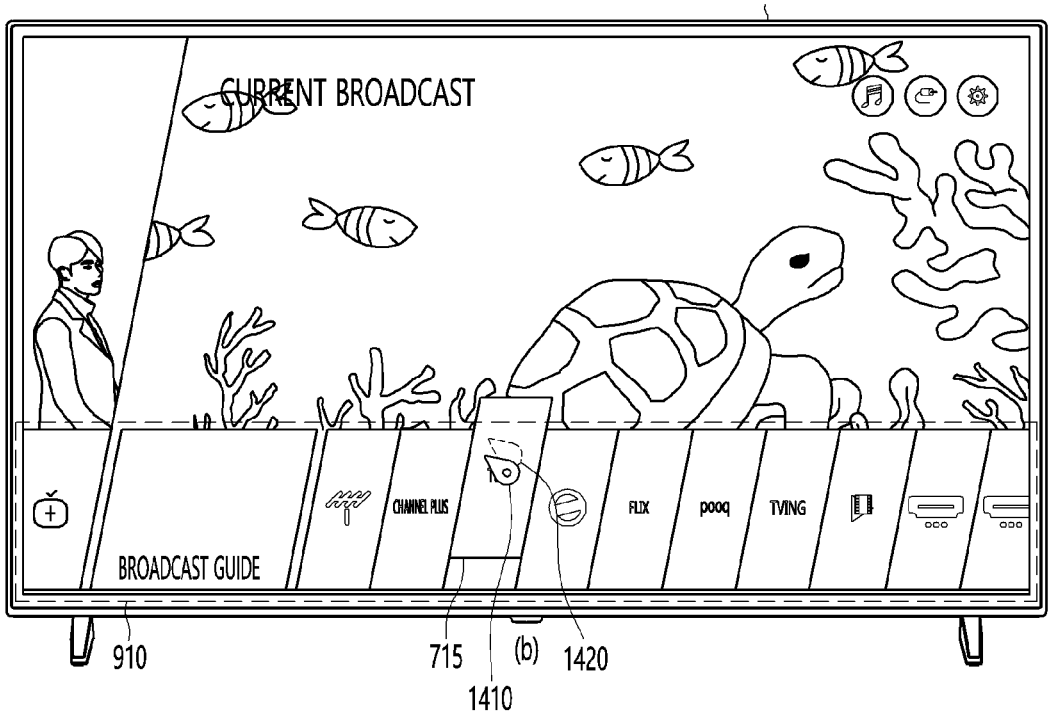

FIG. 19
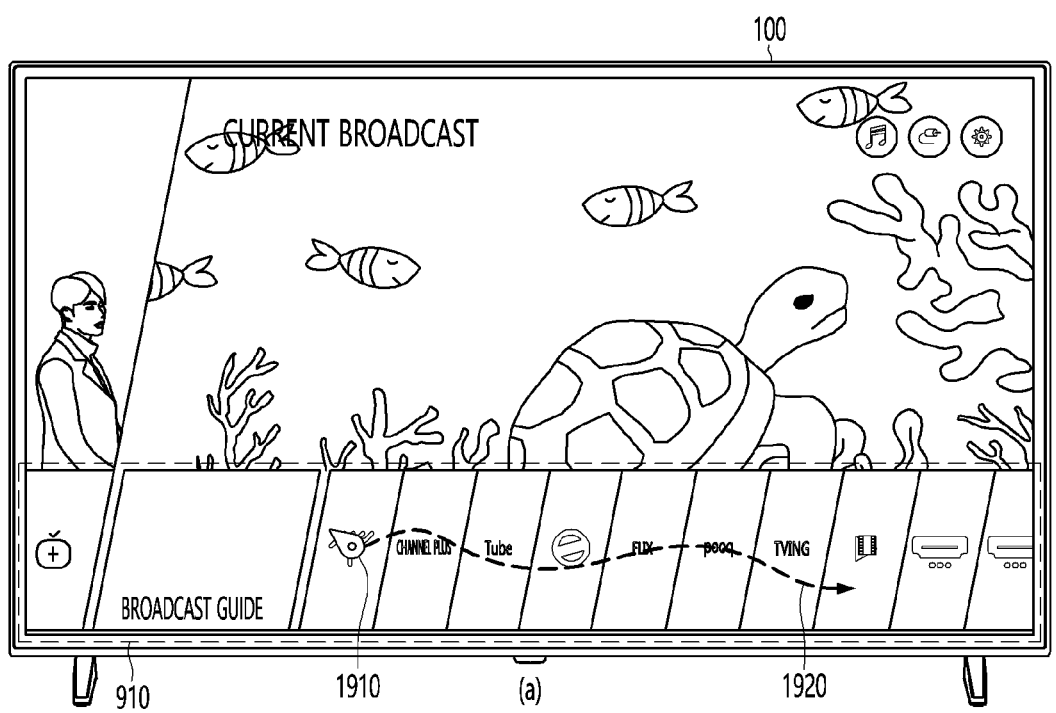
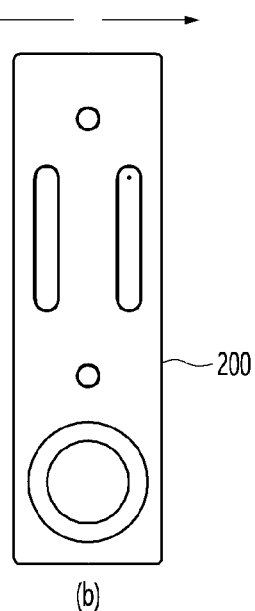

FIG. 20
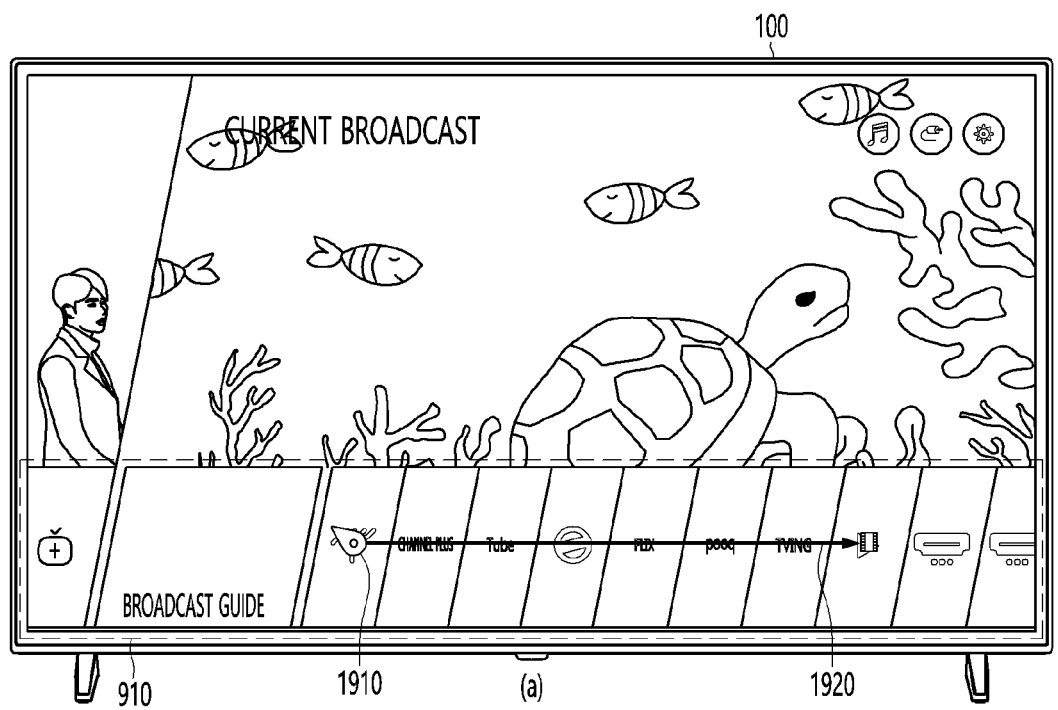
(a)
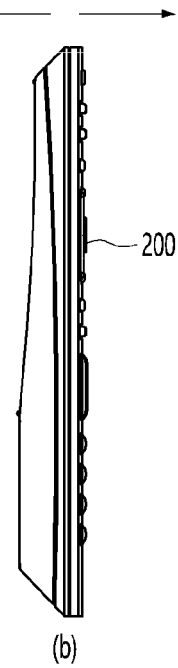
(b)

FIG. 21
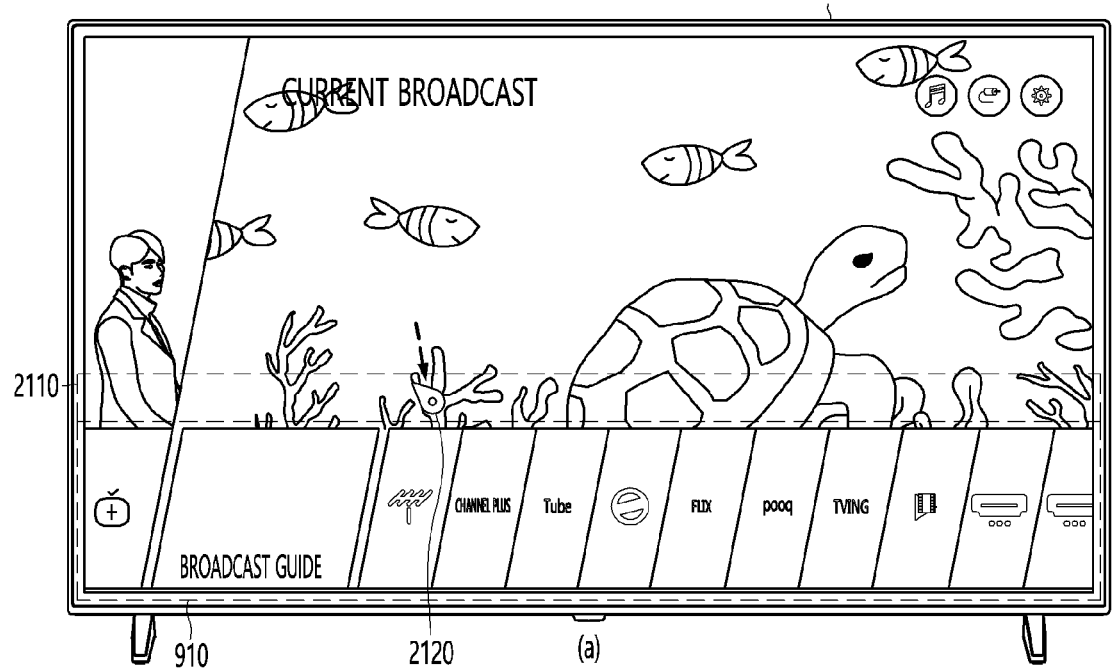
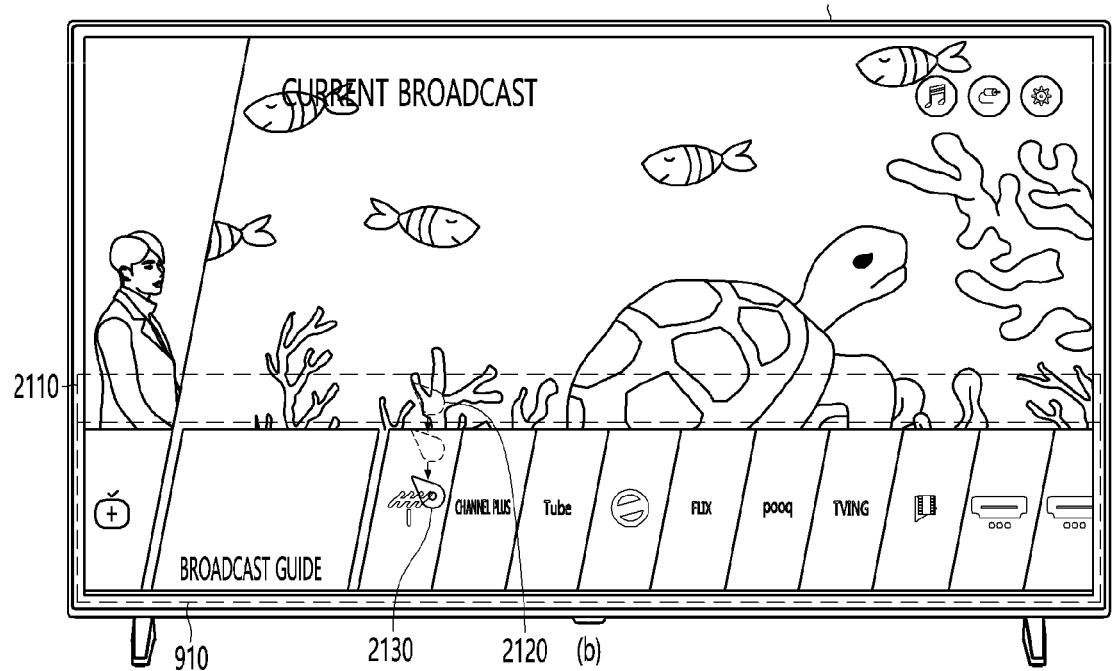

FIG. 22
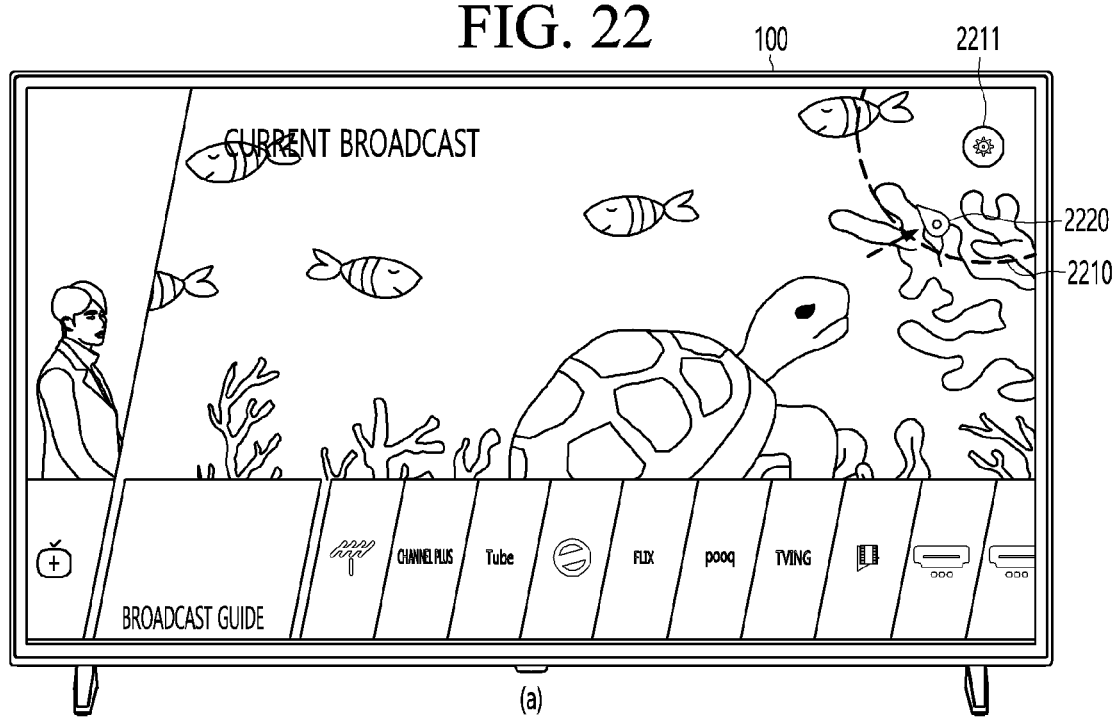
(a)
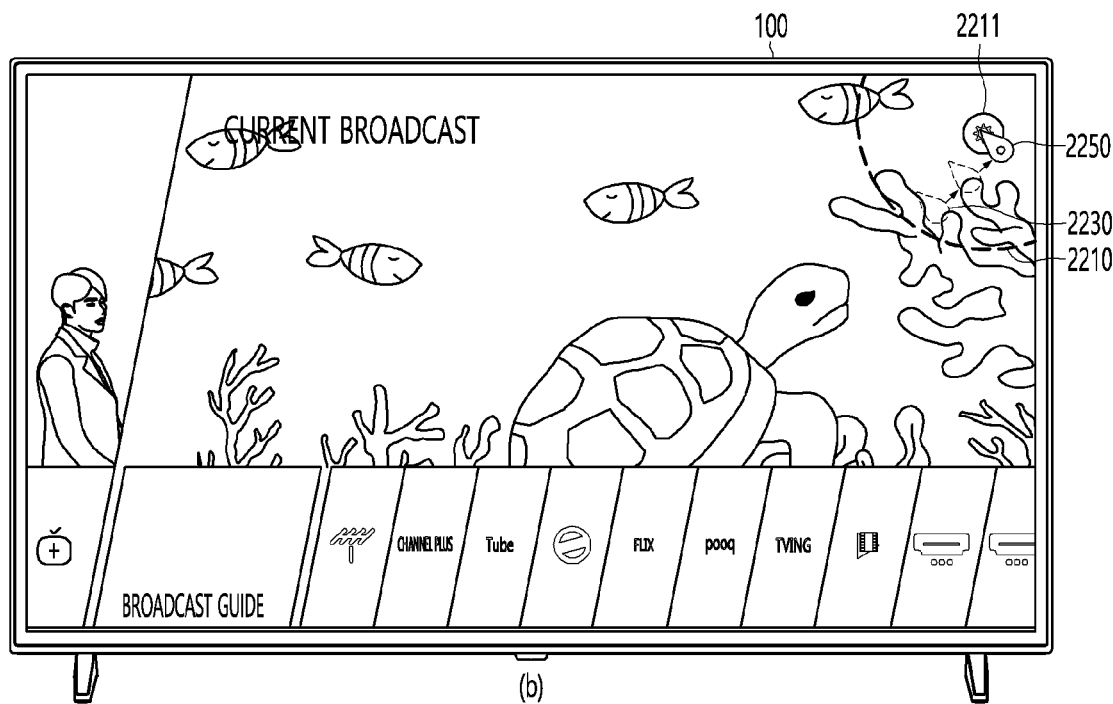
(b)

DISPLAY APPARATUS

CROSS-REFERENCE TO RELATED APPLICATION

This application is the National Phase of PCT International Application No. PCT/KR2018/003432, filed on Mar. 23, 2018, which claims priority under 35 U.S.C. 119(a) to Patent Application No. 10-2018-0014163, filed in Republic of Korea on Feb. 5, 2018, all of these applications are hereby expressly incorporated by reference in their entirety for all purposes as if fully set forth herein.

TECHNICAL FIELD

The present disclosure relates to display device capable of moving a pointer while fixing the pointer in a specific direction, even though an input to a pointer shaken is made.

BACKGROUND ART

A digital TV service using a wired or wireless communication network has come into wide use. The digital TV service can provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service can provide various additional services, e.g., Internet search, home shopping, online games, etc. based on such interactivity.

Meanwhile, recently, there has been introduced a technology of sensing movement of a remote control device and moving a pointer corresponding to the movement of the remote control device, thereby performing various control operations.

In this case, a user performs various control operations by moving the remote control device while holding the remote control device with a hand.

However, it is difficult to precisely control the moving direction or the moving degree of the remote control device because an arm of the user is shaken.

Accordingly, the pointer can move in a zig-zag pattern, so the moving distance of the pointer may not be precisely controlled. Accordingly, it can be difficult for the pointer to move to a desired menu.

DISCLOSURE

Technical Problem

The present disclosure is to provide a display device capable of moving a pointer while fixing the pointer in a specific direction, even though an input to a pointer shaken is made.

The present disclosure is to provide a display device capable of moving a pointer to a menu without the control of a user, when the pointer approaches the menu.

Technical Solution

A display apparatus is disclosed. A display apparatus according to an embodiment of the present invention comprises: a display to display a pointer; a user input interface unit to receive a user input to move the pointer; and a controller to move the pointer while fixing the pointer in a specific direction, when real coordinates of the pointer, which are matched to the user input, are positioned in a menu region and when the user input to move the pointer is received.

Advantageous Effects

According to the present disclosure, the pointer can be linearly moved to be easily moved to the desired menu, even when a remote control device is shaken (e.g., moved in a non-linear direction).

In particular, the pointer is horizontally moved when menus are horizontally arranged and vertically moved when menus are vertically arranged, such that the pointer can be moved according to the intent of the user.

DESCRIPTION OF DRAWINGS

FIG. 5 shows views illustrating problems occurring when controlling the movement of a pointer corresponding to the movement of a remote control device.

FIG. 9 is a view illustrating a position of displaying a pointer, according to an embodiment of the present disclosure.

FIG. 10 is a view illustrating a manner of displaying a pointer without hiding an identification on a menu, according to an embodiment of the present disclosure.

FIGS. 14 and 15 are view illustrating a manner of warning that a pointer is out of a menu region by displaying and changing a menu.

FIGS. 16 and 17 are view illustrating a manner of warning deviation of a pointer by displaying and changing a pointer.

FIGS. 19 and 20 are views illustrating a manner for moving a pointer depending on a pointer moving mode, according to an embodiment of the present disclosure.

FIG. 21 is a view illustrating a manner for attracting a pointer, according to an embodiment of the present disclosure.

FIG. 22 is a view illustrating a manner of attracting a pointer to a button, according to another embodiment of the present disclosure.

DETAILED DESCRIPTION OF THE EMBODIMENTS

Figure 1:
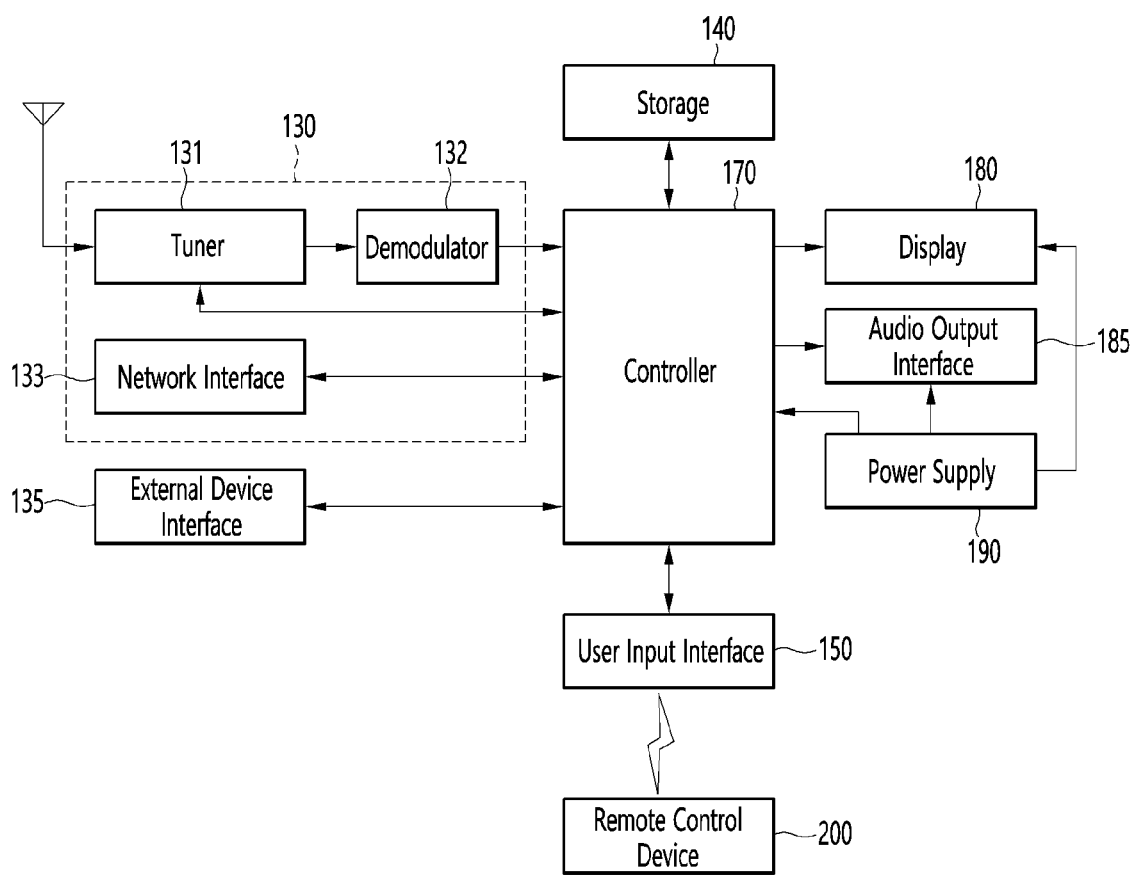
FIG. 1 is a block diagram illustrating a configuration of a display device according to an embodiment of the present disclosure.

Hereinafter, an embodiment of the present disclosure will be described in more detail with reference to the accompanying drawings. The same or similar component will be assigned with the same reference numeral, and the repeated duplication thereof will be omitted. The suffixes "module" and "interface" for components used in the description below are assigned or mixed in consideration of easiness in writing the specification and do not have distinctive meanings or roles by themselves. In the following description of the present disclosure, a detailed description of known functions and configurations incorporated herein will be omitted to avoid making the subject matter of the present disclosure unclear. In addition, accompanying drawings are provided for the illustrative purpose, and the technical spirit of the present disclosure is not limited to the accompanying drawings. It can be understood by those skilled in the art that all variations, equivalents, and substitutes are falling within the technical scope of the present disclosure.

Although the terms first, second, etc. can be used herein to describe various components, these components should not be limited by these terms. These terms are used to distinguish one component from another component.

It will be understood that when a component is referred to as being coupled with/to" or "connected to" another component, the component can be directly coupled with/to or connected to another component or an intervening component can be present therebetween. Meanwhile, it will be understood that when a component is referred to as being directly coupled with/to" or "connected to" another component, an intervening component can be absent therebetween.

The singular forms are intended to include the plural forms unless the context clearly indicates otherwise.

In the present specification, it will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Hereinafter, embodiments of the present disclosure will be described with reference to accompanying drawings in the present specification.

FIG. 1 is a block diagram illustrating a configuration of a display device according to an embodiment of the present disclosure.

Referring to FIG. 1, a display device 100 can be implemented with a TV, a monitor, a projector, or a device including the same.

The display device 100 can include a broadcast reception module 130, an external device interface 135, a storage 140, a user input interface 150, a camera 160, a controller 170 (e.g., processor, CPU), a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

In addition, some content data stored in the display device 100 can be transmitted to a user or an electronic device selected from other user(s) or other electronic device(s) previously registered in the display device 100.

The network interface 133 can access a predetermined webpage through an accessed network or another network linked to the accessed network. That is, the network interface 133 can transmit or receive data to or from a corresponding server by accessing a predetermined webpage through network.

Then, the network interface 133 can receive contents or data provided from a content provider or a network operator.

That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The display device 100 can be connected to an external device through the external device interface 135 in a wireless or wired manner.

The external device interface 135 can receive at least one of an image or audio data output from the external device and transmit the at least one of the image or audio data to the controller 170. The external device that can be connected to the external device interface 135 can be any one of a set-top box, a Blu-ray player, a DVD player, a game device, a sound bar, a terminal such as a smartphone, a PC, a USB memory, and a home theater.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

Figure 2:
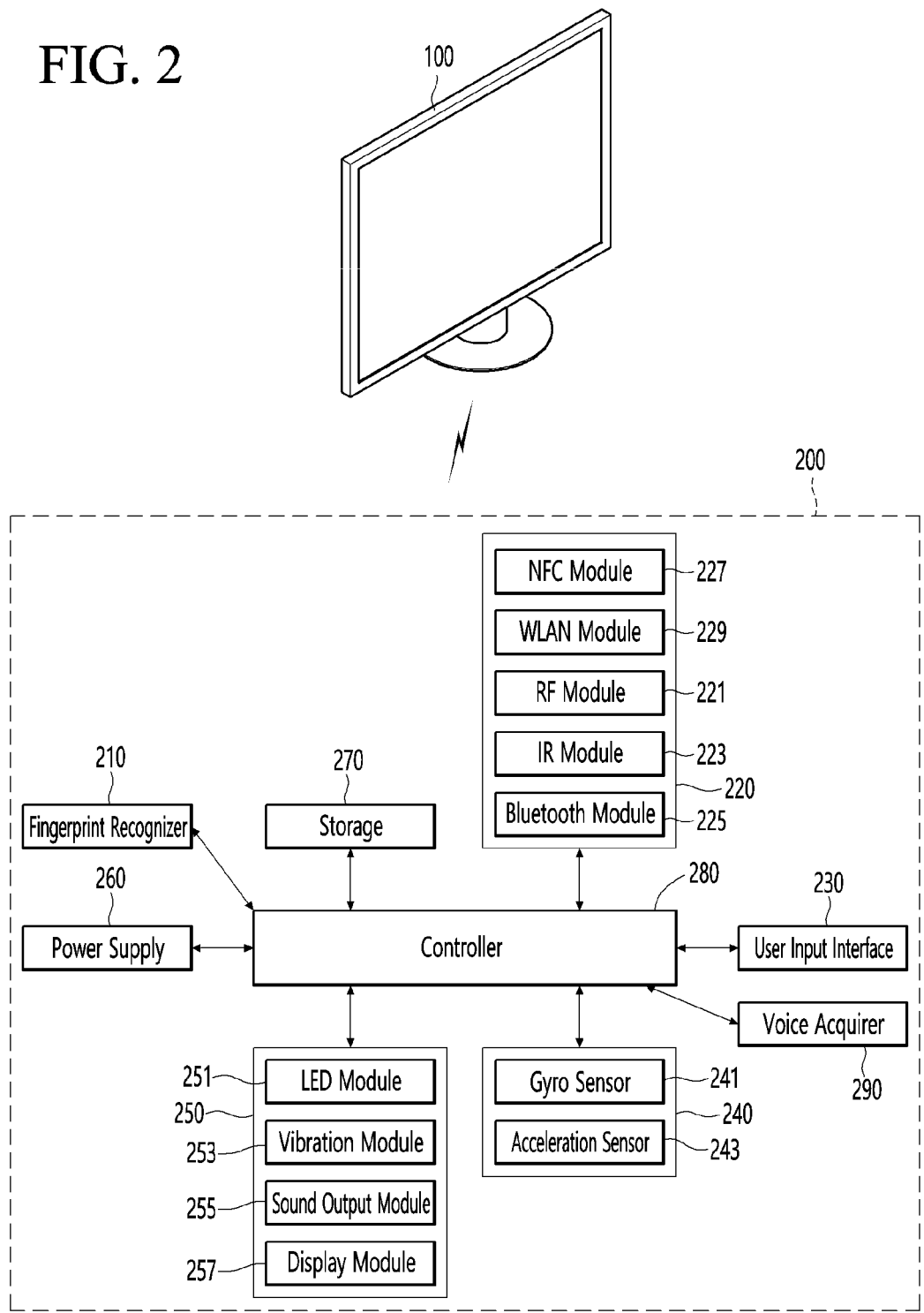
FIG. 2 is a block diagram illustrating a remote control device according to an embodiment of the present disclosure.
Figure 3:
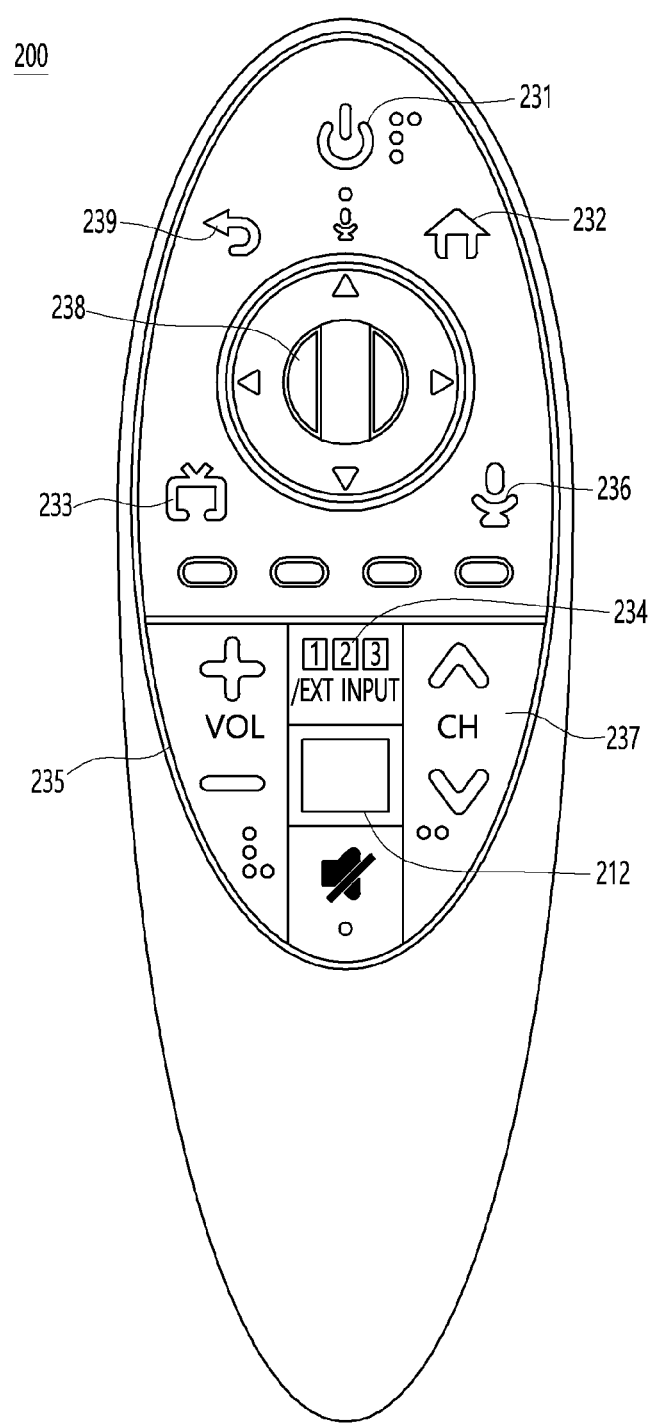
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280 (e.g., processor, CPU), and a voice acquisition module/voice acquirer 290.

Referring to FIG. 2, the wireless communication interface 220 transmits a signal to the display device or receives the signal from the display device according to an embodiment of the present disclosure as described above.

The remote control device 200 can include the RF module 221, which can transmit a signal to the display device 100 or receive the signal from the display device 100 according to an RF communication standard and an IR module 223 which can transmit a signal to the display device 100 and receives the signal from the display device 100 according to an IR communication standard. In addition, the remote control device 200 can include a Bluetooth module 225 which can transmit a signal to the display device 100 or receive the signal from the display device 100 according to a Bluetooth standard. In addition, the remote control device 200 can include an NFC module 227, which can transmit a signal to the display device 100 and receive the signal from the display device 100 according to Near Field Communication (NFC) communication standard and a WLAN module 229 which can transmit a signal to the display device 100 and receive the signal from the display device 100 according to a Wireless LAN (WLAN) communication standard.

Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be a button for adjusting the size of a volume outputted from the display device 100. The voice recognition button 236 can be a button for receiving a user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor to sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module/voice acquirer 290 of the remote control device 200 can obtain voice.

The voice acquisition module/voice acquirer 290 can include at least one microphone and can obtain at least one voice through the microphone.

Figure 4:
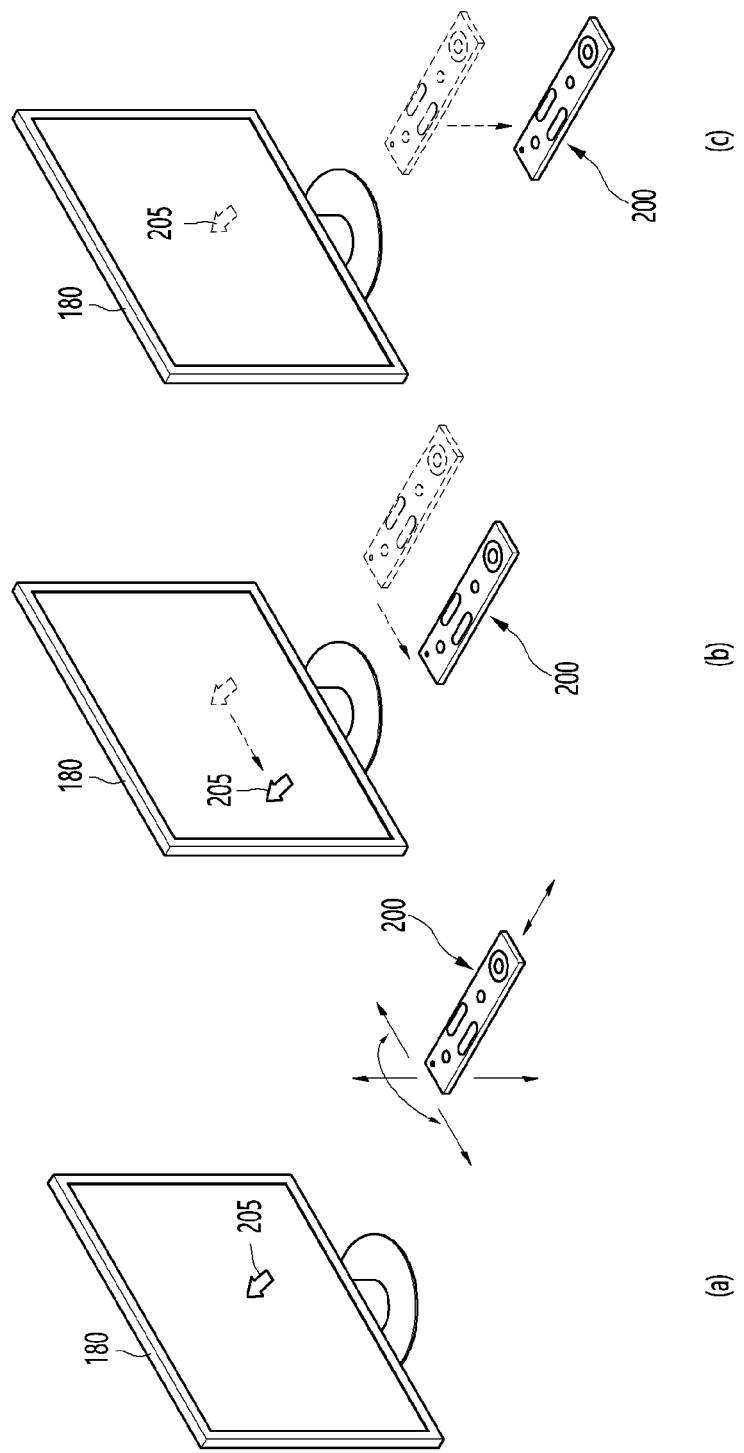
FIG. 4 is a view of utilizing a remote control device according to an embodiment of the present disclosure.

Then, FIG. 4 is described.

FIG. 4 is a view of utilizing a remote control device 200 according to an embodiment of the present disclosure.

Specifically, (a) of FIG. 4 illustrates that a pointer 205 corresponding to the remote control device 200 is displayed on the display 180. That is, a location and direction of the pointer 205 can correspond to a location and direction of the remote control device 200.

A user can move or rotate the remote control device 200 vertically or horizontally to move the pointer 205 vertically or horizontally, respectively. The pointer 205 displayed on the display 180 of the display device 100 corresponds to a movement of the remote control device 200. Since the corresponding pointer 205 is moved and displayed according to a movement on a 3D space as show in FIG. 4, the remote control device 200 can be referred to as a spatial remote controller.

Further, (b) of FIG. 4 illustrates that if a user moves the remote control device 200 to the left, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

Further, (c) of FIG. 4 illustrates that while a specific button in the remote control device 200 is pressed, a user moves the remote control device 200 away from the display 180 to cause a selection area in the display 180 corresponding to the pointer 205 can be zoomed in and displayed largely. That is, when a user simultaneously presses a specific button in the remote control device 200 and moves the remote control device 200 away from the display 180, a selection area in the display 180 corresponding to the pointer 205 can be zoomed in to increase the size of the display.

On the other hand, if a user moves the remote control device 200 close to the display 180 while pressing the specific button, a selection area in the display 180 corresponding to the pointer 205 can be zoomed out and displayed reduced (to reduce the size of the display).

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180 while a specific button in the remote control device 200 is pressed, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

FIG. 5 shows views illustrating problems occurring when controlling the movement of the pointer corresponding to the movement of the remote control device.

A user can perform various control operations by moving the remote control device 200 while holding the remote control device 200 with a hand of the user.

However, it is difficult to precisely control the moving direction of the remote control device 200 because an arm of the user is shaken. That is, it is difficult for a user to precisely hold the remote control device 200 in order to precisely control the moving direction of the remote control device 200.

For example, although a user, who wants to move a pointer 510 in a horizontal direction, moves the remote control device 200 in the horizontal direction, when the arm of the user is shaken or failed to maintain level, the remote control device 200 fails to maintain level. Accordingly, the pointer can be moved in a zig-zag pattern as illustrated in (a) and (b) of FIG. 5.

In this case, it can be difficult to move a pointer to a menu desired by a user.

Figure 6:
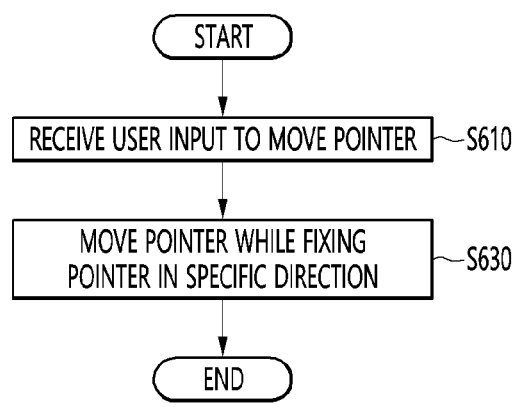
FIG. 6 is a view illustrating an operating manner of a display device, according to an embodiment of the present disclosure.

FIG. 6 is a view illustrating an operating manner of a display device according to an embodiment of the present disclosure.

Referring to FIG. 6, according to an embodiment of the present disclosure, the operating manner of the display device can include receiving a user input to move the pointer (S610) and moving the pointer while fixing the pointer in a specific direction when the user input to move the pointer is received (S630).

Hereinafter, first, the receiving of the user input to move the pointer (S610) will be described.

A user input interface can receive the user input to move the pointer. In detail, the user input interface can receive, from a remote control device, a signal corresponding to the movement of the remote control device.

The controller can determine coordinates of the pointer matched to the user input. In detail, when the user moves the remote control device, the controller can receive, from the remote control device, the signal corresponding to the movement of the remote control device. In addition, when receiving the signal corresponding to the movement of the remote control device, the controller can determine coordinates for displaying the pointer, based on the movement of the remote control device.

Meanwhile, when the user input to move the pointer is received from the user input interface, the controller can control the display to display the pointer depending on the movement of the remote control device.

Hereinafter, the moving of the pointer while fixing the pointer in the specific direction when the user input to move the pointer is received (S630) will be described with reference to FIGS. 7 to 18.

Figure 7:
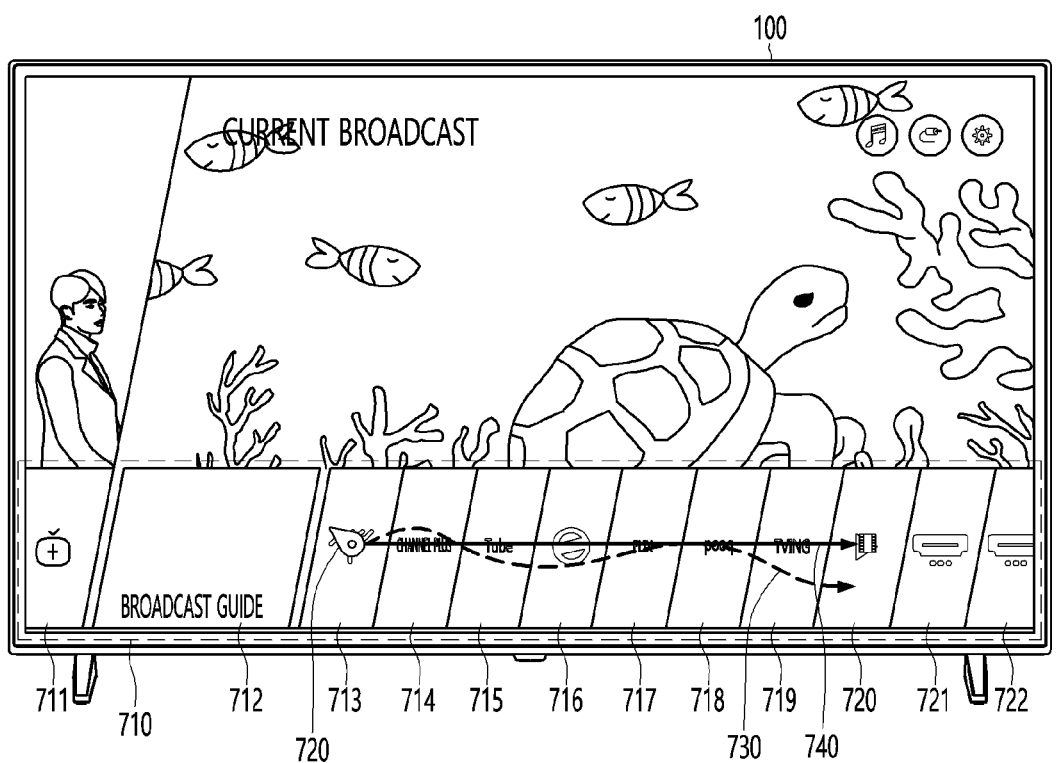
FIG. 7 is a view illustrating a manner of moving a pointer while fixing the pointer in a specific direction, according to an embodiment of the present disclosure.

FIG. 7 is a view illustrating a manner of moving the pointer while fixing the pointer in the specific direction, according to an embodiment of the present disclosure.

The screen can include a menu region 710. In this case, the menu region 710 can include a plurality of menus 711, 712, 713, 714, 715, 716, 717, 718, 719, 720, 721, and 722.

In addition, the plurality of menus 711, 712, 713, 714, 715, 716, 717, 718, 719, 720, 721, and 722 included in the menu region can be arranged in the horizontal direction as illustrated in FIG. 7.

Meanwhile, the controller can determine whether real coordinates of a pointer 720 matched to the user input are positioned in the menu region 710.

When the user input to move the pointer 720 is received in the state that the real coordinates of a pointer 720 matched to the user input are positioned in the menu region 710, the controller can move the pointer 720 while fixing the pointer 720 in the specific direction.

For example, as illustrated in FIG. 7, when the plurality of menus 711, 712, 713, 714, 715, 716, 717, 718, 719, 720, 1721, and 722 are arranged in the horizontal direction, the controller can move the pointer 720 while fixing the pointer 720 in the horizontal direction.

A first direction 730 illustrated in FIG. 7 indicates the moving direction of real coordinates of the pointer matched to the user input, and a specific direction 740 indicates a direction in which the pointer 720 is displayed while the pointer 720 actually moves.

In this case, the real coordinates of the pointer 720 can refer to coordinates determined depending on the movement of the remote control device, regardless of coordinates at which the pointer is displayed.

Accordingly, the moving direction of the real coordinates of the pointer matched to the user input can refer to the direction of moving the pointer based on the movement of the remote control device, when the moving of the pointer while fixing the pointer in the specific direction is not applied.

As illustrated in FIG. 7, the specific direction 740 in which the pointer 720 is moved can differ from the moving direction of the real coordinates of the pointer depending on the remote control device.

In other words, on the assumption that the remote control device 200 moves in the horizontal direction while being shaken up and down, even if the real coordinates of the pointer is moved in a direction of forming 45 degrees from a right direction, the pointer 720 can move in the right direction, and even if the real coordinates of the pointer is moved in a direction of forming −30 degrees from the right direction, the pointer 720 can move the right direction.

In other words, although the remote control device 200 moves in the horizontal direction while being shaken up and down, the pointer 720 can be moved while fixing the pointer in the specific direction.

Meanwhile, when the pointer 720 moves in the specific direction, the moving distance of the pointer 720 can correspond to a movement component in a specific direction of the remote control device. For example, when the pointer moves by '2' in a direction of forming 60 degrees from the right direction, the pointer 720 can move by '1' in the right direction.

Figure 8A:
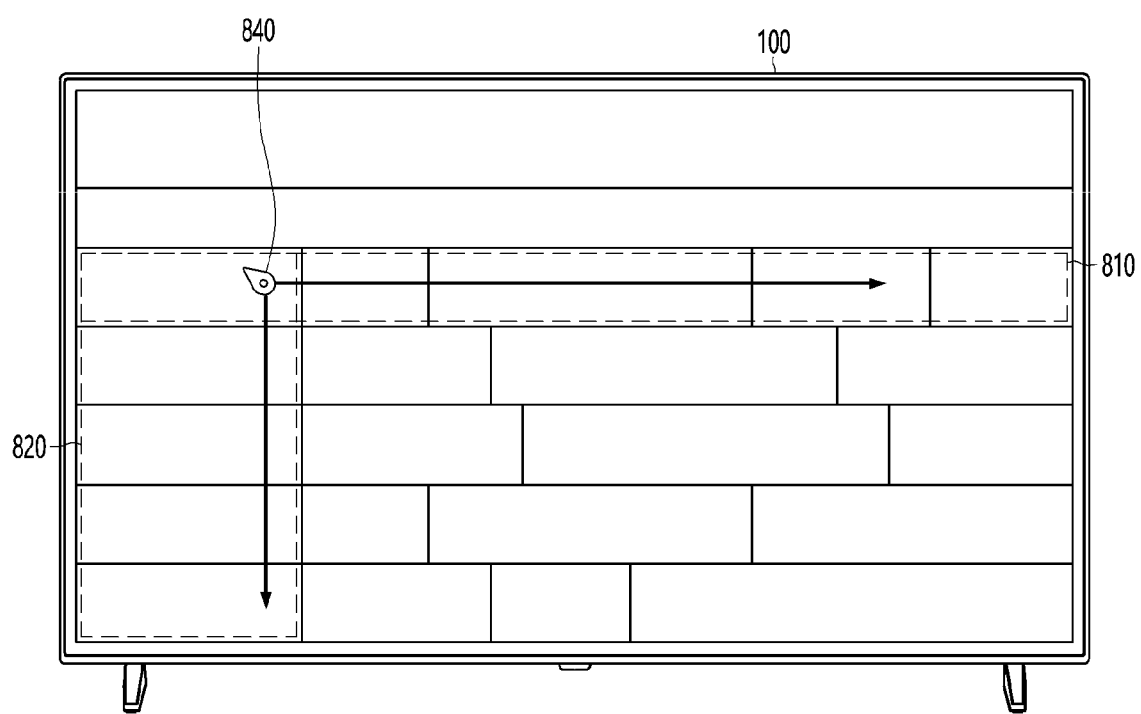
FIGS. 8A to 8C are views illustrating the moving direction of a pointer based on various arrangements of menus.
Figure 8B:
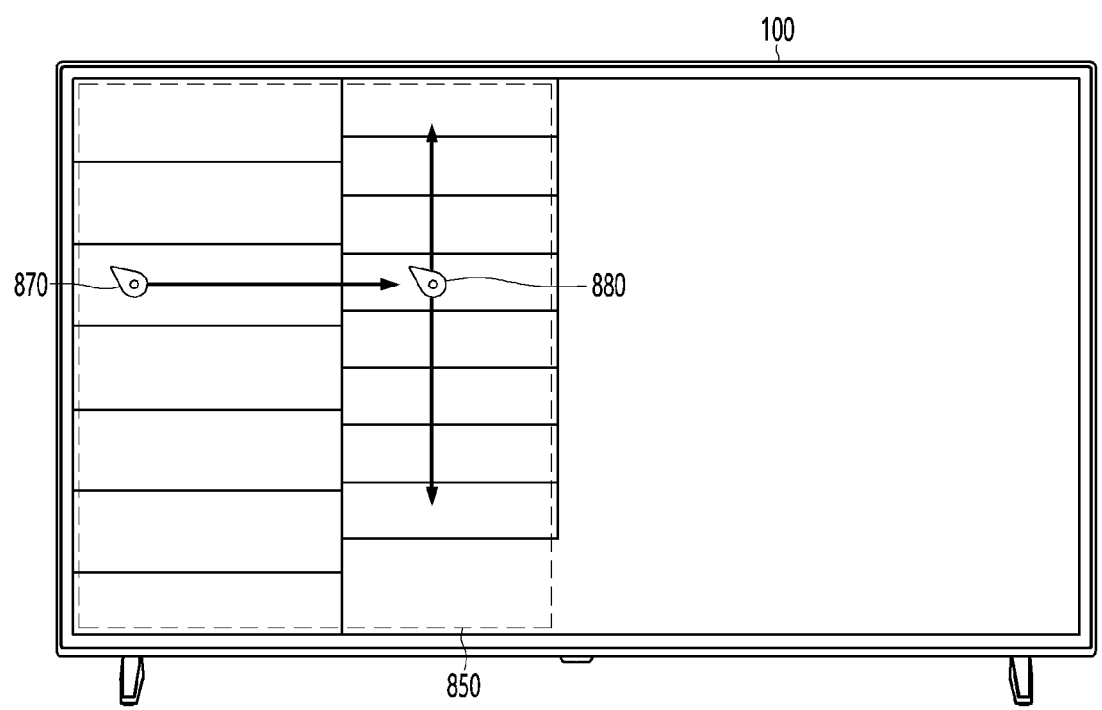
Figure 8C:
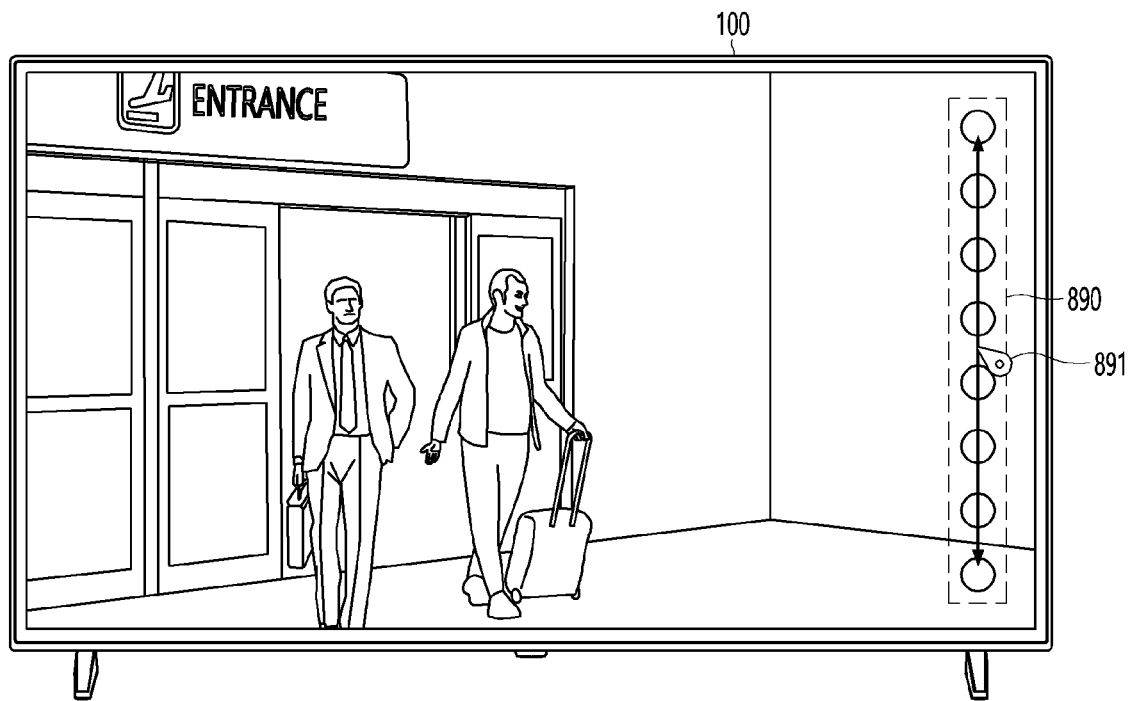

FIGS. 8A to 8C are views illustrating the moving direction of the pointer based on various arrangements of menus.

Referring to FIG. 8A, the controller can determine whether real coordinates of a pointer 840 matched to the user input is positioned in a first menu 810.

When the user input to move the pointer 840 is received in the state that the real coordinates of a pointer 840 matched to the user input are positioned in the menu region 810, the controller can move the pointer 840 while fixing the pointer 720 in the specific direction.

For example, as illustrated in FIG. 8A, when a plurality of menus in a first menu region 810 are arranged in the horizontal direction, the controller can move a pointer 840 while fixing the pointer 840 in the horizontal direction.

In addition, referring to FIG. 8A, the controller can determine whether real coordinates of the pointer 840 matched to the user input are positioned in a second menu region 820.

When the user input to move the pointer 840 is received in the state that the coordinates of the pointer 840 matched to the user input are positioned in the second menu region 820, the controller can move the pointer 840 while fixing the pointer 840 in the specific direction.

For example, as illustrated in FIG. 8A, when a plurality of menus in the second menu region 820 are arranged in the vertical direction, the controller can move a pointer 840 while fixing the pointer 840 in the vertical direction.

When the real coordinates of the pointer 840 are positioned in a plurality of regions (the first menu region and the second menu region), the controller can move the pointer while fixing the pointer in the horizontal direction or vertical direction, based on the moving direction of the real coordinates of the pointer 840.

In detail, when a vertical component of the moving direction of the real coordinates of the pointer 840 is greater than a horizontal component of the moving direction of the real coordinates of the pointer 840, the controller move the pointer while fixing the pointer in the vertical direction.

Referring to FIG. 8B, the controller can determine whether real coordinates of a first pointer 870 matched to the user input are positioned in the first menu region 850.

When the user input to move the first pointer 870 is received in the state that the real coordinates of the first pointer 870 matched to the user input are positioned in the first menu region 850, the controller can move the pointer 870 while fixing the first pointer 870 in the specific direction.

In this case, when a horizontal component of the moving direction of the real coordinates of the first pointer 870 is greater than a vertical component of the moving direction of the real coordinates of the first pointer 870, the controller moves the first pointer 870 while fixing the pointer in the horizontal direction (that is, the controller moves the first pointer 870 in only the horizontal direction corresponding to the direction (left or right) of the remote control device 200).

In addition, the controller can determine whether the real coordinates of a second pointer 880, which is a pointer after movement, are positioned in the first menu region 850.

When the user input to move the second pointer 880 is received in the state that the real coordinates of the second pointer 880 are positioned in the first menu region 850, the controller can move the second pointer 880 while fixing the second pointer 880 in the specific direction.

In this case, when a vertical component of the moving direction of the real coordinates of the second pointer 880 is greater than a horizontal component of the moving direction of the real coordinates of the second pointer 880, the controller moves the second pointer 870 while fixing the pointer in the vertical direction.

Referring to FIG. 8C, the controller can determine whether real coordinates of a first pointer 870 matched to the user input are positioned in a first menu region 890.

In addition, a plurality of menus is arranged in a vertical direction in the first menu region 890.

When the user input to move the pointer 891 is received in the state that the real coordinates of a pointer 891 matched to the user input are positioned in the first menu region 890, the controller can move the pointer 891 while fixing the pointer 840 in the vertical direction.

According to the present disclosure, the pointer 891 can be linearly moved to be easily moved to the desired menu, even though a remote control device 200 is shaken.

In particular, the pointer 891 is horizontally moved when the menus are horizontally arranged, and is vertically moved when the menus are vertically arranged, so the pointer 891 can be moved based on the intent of the user.

FIG. 9 is a view illustrating a position of displaying a pointer, according to an embodiment of the present disclosure.

As illustrated in (a) of FIG. 9, when real coordinates of a pointer 920 enter a menu region 910, the controller can display the pointer at a fixed height 'h' as illustrated in (b) of FIG. 9.

In detail, when a plurality of menus included in a menu region 920 are arranged in a horizontal direction and the real coordinates of the pointer 920 enters the menu region 910, the controller can display the pointer 920 at the fixed height 'h'.

In this case, the controller can move the pointer which has entered the menu region 910 such that the pointer having entered the menu region 910 is displayed at the fixed height 'h'. In this case, the procedure of moving the pointer having entered the menu region 910 to a new position can be displayed.

Meanwhile, coordinates of the new position, to which the pointer has been moved, can be referred to as 'correction coordinates'.

Meanwhile, when a user input to move a pointer is received in the state that the pointer 920 is displayed at the fixed height 'h', the controller can move the pointer 920 while fixing the pointer 920 in the horizontal direction.

In other words, even if the pointer moves left or right, the pointer can be constantly maintained at the fixed height 'h'.

Meanwhile, the embodiment of FIG. 9 can be applied to a plurality of menus arranged in the vertical direction.

In detail, when real coordinates of the pointer enter a menu region, the controller can display the pointer with a fixed width. In detail, when a plurality of menus included in a menu region are arranged in a vertical direction and the real coordinates of the pointer enters the menu region, the controller can display the pointer 920 with the fixed width.

In this case, the controller can move the pointer 920, which has entered the menu region 910, such that the pointer 920 having entered the menu region is displayed with the fixed width. Accordingly, the procedure of moving the pointer having entered the menu region to a new position can be displayed.

Meanwhile, when a user input to move a pointer 920 is received in the state that the pointer is displayed at the fixed height 'h', the controller can move the pointer 920 while fixing the pointer 920 in the vertical direction.

In other words, even if the pointer 920 moves up or down, the pointer 920 can be constantly maintained with the fixed width.

FIG. 10 is a view illustrating a manner of displaying a pointer without hiding an identification (e.g., a label for a button) on a menu, the menu comprising a plurality of identifications (labels for buttons) according to an embodiment of the present disclosure.

The controller can display the identification (ID) included in a menu of a menu region at a fixed height or with the fixed width, such that the ID is not hidden by the pointer.

In detail, as illustrated in (a) of FIG. 10, when the real coordinates of the pointer enters the menu region, the controller can display the pointer at the fixed height 'h'.

In this case, the fixed height 'h' can be lower than a height at which an ID (reference numeral 1011) in a menu is positioned. In this case, the ID 1011 can be a text or an image to identify the menu including the ID 1011.

In other words, according to the present disclosure, the pointer 1020 is displayed under the ID 1011 in the menu, thereby preventing the ID 1011 from being hidden by the pointer 1020.

Meanwhile, as illustrated in (b) of FIG. 10, when a pointer 1020 is positioned on a specific menu 715, the controller can display the pointer 1020 by moving the specific menu 715, to prevent the specific menu 715 from hiding the ID 1021 and to indicate (selection of) the specific menu 715.

In detail, when a height, at which the ID 1021 indicating the specific menu 715 is displayed, is equal to a height at which the pointer 1020 is displayed, the pointer 1020 can be displayed on the ID 1021 indicating the specific menu 715. In this case, the ID 1021 is hidden by the pointer 1020, so the ID 1021 may not be viewed.

To prevent this, when the pointer 1020 is positioned on the specific menu 715, the controller can display the pointer 1020 by moving the specific menu 715 such that the ID 1021 and the pointer 1020 are not displayed in the same region.

When the specific menu 715 is moved, since the ID 1021 included in the specific menu 715 is moved, the ID 1021 can be prevented from being overlapped with the pointer 1020.

Meanwhile, the description made with reference to FIG. 10 will be identically applied to an embodiment in which the pointer is displayed with a fixed width.

In detail, when real coordinates of the pointer enter a menu region, the controller can display the pointer with a fixed width.

In this case, the fixed width can be less than or greater than a width at which an ID is positioned in a menu.

In other words, according to the present disclosure, the pointer is displayed beside the ID in the menu, thereby preventing the ID from being hidden by the pointer.

Meanwhile, when a pointer is positioned on a specific menu, the controller can display the pointer by moving the specific menu to prevent the pointer from hiding an ID indicating the specific menu.

In detail, when a width, at which an ID indicating the specific menu is displayed, is equal to a width at which the pointer is displayed, the pointer can be displayed on the ID indicating the specific menu. In this case, the ID can be hidden by the pointer, so the ID may not be viewed.

To prevent the pointer from blocking the ID, when the pointer is positioned on the specific menu, the controller can display the pointer by moving the specific menu such that the ID and the pointer are not displayed in the same region.

When the specific menu is moved, since the ID included in the specific menu is moved, the ID can be prevented from being overlapped with the pointer.

Figure 11:
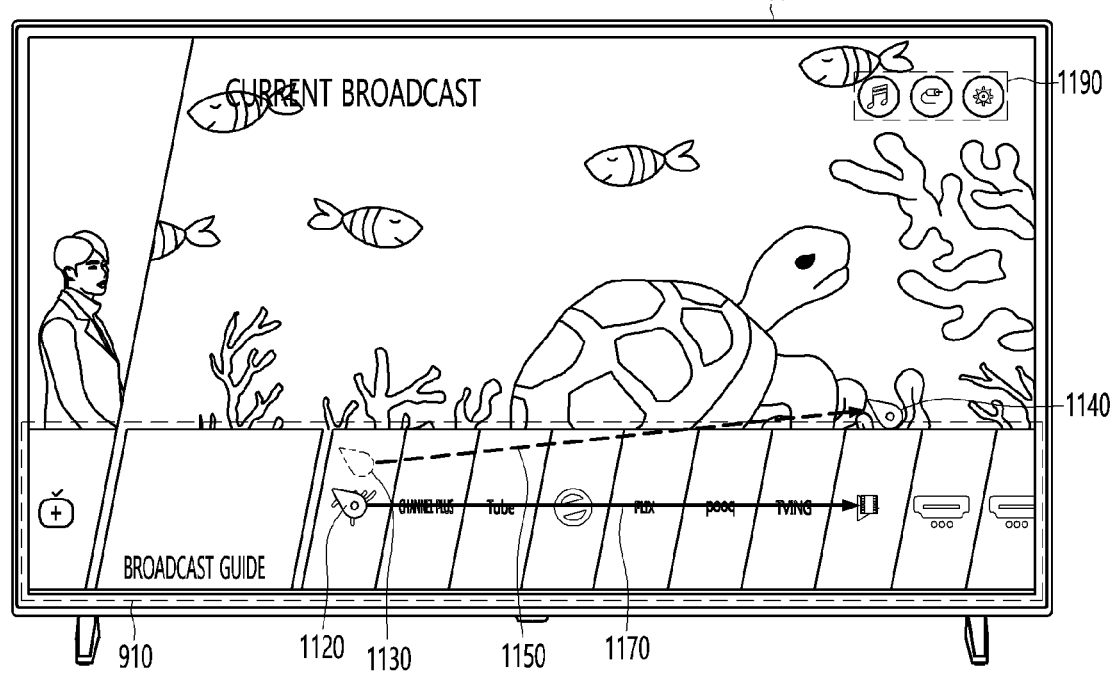
FIG. 11 is a view illustrating a problem that can occur when a pointer entering a menu region is moved to a fixed height, according to an embodiment of the present disclosure.

FIG. 11 is a view illustrating a problem that can occur when a pointer entering a menu region is moved to a fixed height, according to an embodiment of the present disclosure.

When real coordinates of the pointer is positioned in a menu region 910, the pointer can be displayed in the menu region 910.

However, the pointer can need to be out of the menu region 910. For example, the pointer which is out of the menu region 910 can move to another menu region 1190. Accordingly, when the real coordinates of the pointer 1120 is positioned out of the menu region 910, the controller displays the pointer at the real coordinates thereof.

Meanwhile, when real coordinates 1130 of the pointer 1120 enters the menu region, the pointer 1120 moves down and is displayed at the fixed height.

In this case, the user recognizes that the position of the real coordinates 1130 of the pointer 1120 is a position of the pointer 1120 displayed. However, the real coordinates 1130 of the pointer 1120 is the same as a point at which the real coordinates of the pointer 1120 enters the menu region 910.

Accordingly, the real coordinates 1130 of the pointer 1120 can move in the first direction 1150 if a user is slightly careless about the operation of the remote control device 200. In this case, the real coordinates can be out of the menu region 910.

In addition, when the real coordinates of the pointer is out of the menu region 910, a pointer 1140 can be displayed out of the menu region 910 (the pointer outside of the menu region 910 being designated as reference numeral 1140).

In other words, although the user expects that the pointer 1120 moves in a horizontal direction 1170, the pointer 1120 can be actually displayed out of the menu region 910.

To prevent this, when the real coordinates of the pointer enters the menu region, the controller can change the real coordinates to coordinates corresponding to the fixed height.

The details thereof will be described with reference to FIG. 12.

Figure 12:
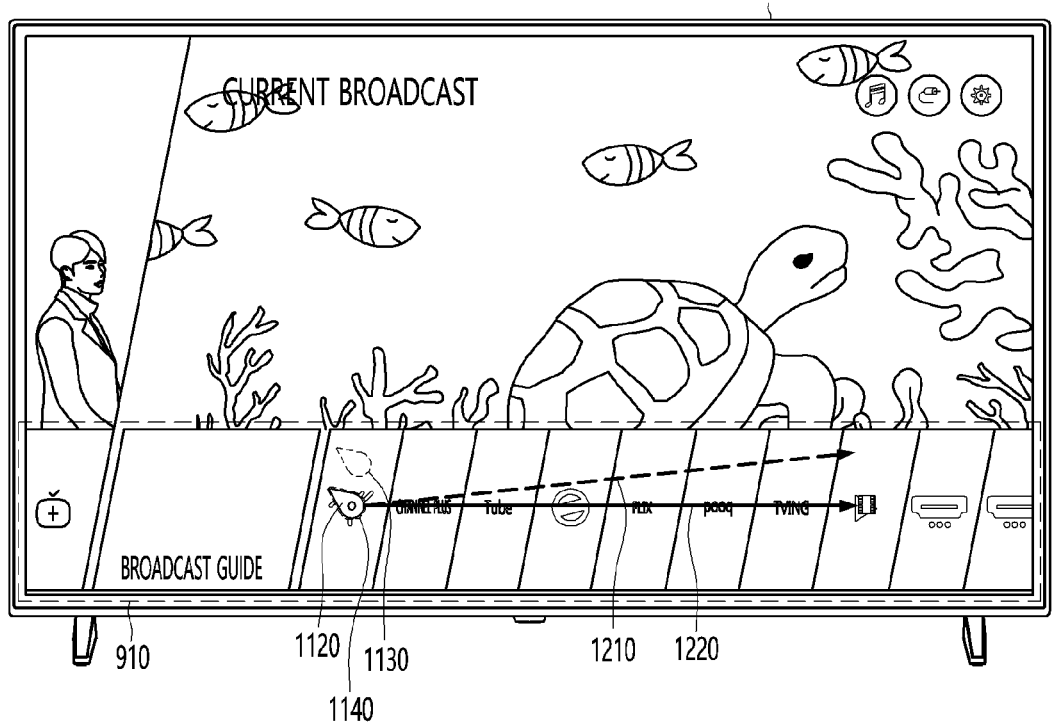
FIG. 12 is a view illustrating a manner of changing real coordinates, according to an embodiment of the present disclosure.

Referring to FIG. 12, when the real coordinates 1130 of the pointer 1120 enters the menu region 910, the controller can display the pointer 1120 which has moved to the fixed height.

In this case, the controller can change the real coordinates 1130 of the pointer 1120 to new real coordinates 1140. In this case, the new real coordinates 1140 can be coordinates corresponding to the fixed height, that is, coordinates in which the pointer 1120 having moved is displayed.

In other words, the position of the pointer 1120 actually displayed can be the same as a position of the real coordinates 1140 of the pointer.

In this case, a user recognizes the position of the pointer 1120 displayed as a position of the real coordinates 1140 of the pointer.

In addition, the height at which the pointer 1120 is displayed can be an intermediate height of the whole height of the menu region 910. Alternatively, the height, at which the pointer 1120 is displayed, can be a height from a position closer to the intermediate height from the point, at which the pointer enters, of the menu region 910.

Accordingly, even if a user erroneously operates the remote control device 200 to move the real coordinates 1140 of the pointer in the first direction 1210, the probability in which the real coordinates 1140 of the pointer is out of the menu region 910 can be reduced. Therefore, the pointer 1120 can stably move in the specific direction 1220.

Meanwhile, the description made with reference to FIG. 12 will be identically applied to a case that the pointer is displayed with a fixed width.

In detail, when the real coordinates of the pointer enters the menu region, the controller can display a pointer which has moved with a fixed width.

In this case, the controller can change real coordinates of the pointer to new real coordinates. In this case, the new real coordinates can be coordinates corresponding to the fixed width, that is, coordinates in which the pointer having moved is displayed.

In other words, the position of the pointer actually displayed can be the same as the position of the real coordinates of the pointer.

In this case, a user recognizes the position of the pointer displayed as a position of the real coordinates of the pointer.

In addition, the width at which the pointer is displayed can be an intermediate width of the whole width of the menu region. Alternatively, the width, at which the pointer is displayed, can be a width from a point, which is close to the intermediate width, from a point, which the pointer enters, of the menu region.

Figure 13:
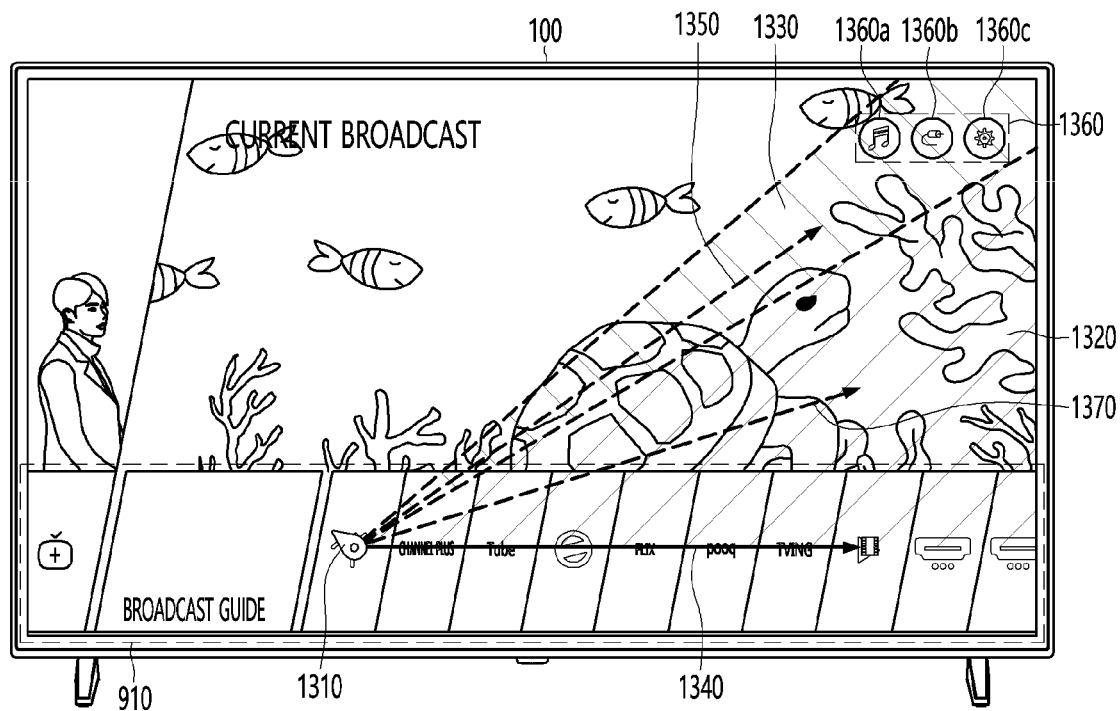
FIG. 13 is a view illustrating another embodiment to solve a problem described with reference to FIG. 11.

FIG. 13 is a view illustrating another embodiment to solve the problem described with reference to FIG. 11.

The above description has been made in that the pointer is displayed out of the menu region 910, when the real coordinates of the pointer are out of the menu region 910.

However, regardless of that the real coordinates of the pointer are out of the menu region 910, it can be determined whether the pointer is out of the menu region 910 based on the moving direction of the real coordinates.

In detail, the screen can include another menu region 1360. In this case, the another menu region 1360 can include one or more menus 1360a, 1360b, and 1360c.

Meanwhile, when a moving direction 1350 of real coordinates of a pointer is a direction 1330 facing the another menu region 1360, the controller can move the pointer 1310 in the moving direction of the real coordinates.

In addition, when a moving direction 1370 of the real coordinates of the pointer 1310 is a direction 1320 between a direction 1330 facing the another menu region 1360 and a specific direction 1340, the controller can move the pointer 1310 while fixing the pointer 1310 in the specific direction.

When the moving direction 1350 of the real coordinates of the pointer 1310 is a direction 1330 facing the another menu region 1360, it is expected that the intent of the user is to move the pointer 1310 to the another menu region 1360 instead of moving the pointer 1310 into the menu region 910.

In addition, when the moving direction 1350 of the real coordinates of the pointer 1310 is the direction 1320 between a direction 1330 facing the another menu region 1360 and the specific direction 1340, it is expected that the intent of the user is not correct in moving or controlling the pointer 1310 in the menu region 910.

According to the present disclosure, whether the pointer is out of the menu region is determined depending on the moving direction of the real coordinates of the pointer, thereby performing a control operation matching to the intent of the user.

FIGS. 14 to 18 are views illustrating a manner for warning deviation of a pointer, according to an embodiment of the present disclosure.

As described above, real coordinates of the pointer differ from correction coordinates at which the pointer is actually displayed, and a user is not able to recognize the real coordinates of the pointer. Accordingly, the pointer can be out of a menu region when the user erroneously operates a remote control device. Accordingly, a warning to prevent the pointer from being out of the menu region is necessary.

The following description will be made with reference to FIGS. 14 and 15 regarding a manner of warning that the pointer is out of the menu region by displaying and changing a menu 715.

When the real coordinates of the pointer are to be out of the menu area 910, the controller can change and display the shape of a menu in which the pointer is positioned.

In detail, the controller can determine whether the real coordinates of the pointer are to be out of the menu region.

For example, as illustrated in (a) of FIG. 14, when real coordinates 1420 of the pointer 1410 are out of a preset range from the menu region 910 (that is, the distance between the real coordinates 1420 of the pointer 1410 and the boundary of the menu region 910 is longer), the controller can determine whether the real coordinates of the pointer 1410 are not to be out of the menu region.

For another example, as illustrated in (b) of FIG. 14, when real coordinates 1420 of the pointer 1410 are within the preset range from the menu region 910 (that is, the distance between the real coordinates 1420 of the pointer 1410 and the boundary of the menu region 910 is shorter), the controller can determine whether the real coordinates of the pointer 1410 are to be out of the menu region 910.

In addition, when it is determined that the real coordinates of the pointer 1410 are to be out of the menu region 910, the controller can display the menu 715, in which the pointer 1410 is positioned, by tilting the menu 715, as illustrated in (b) of FIG. 14.

Meanwhile, the menu 715, in which the pointer 1410 is positioned, can be a three-dimensional image. When it is determined that the real coordinates of the pointer 1410 are to be out of the menu region, the controller can display an effect in which the three-dimensional image is tilted.

When the real coordinates of the pointer are to be out of the menu area 910, the controller can change and display the position of a menu in which the pointer is positioned.

For example, as illustrated in (a) of FIG. 15, when the real coordinates 1420 is far away from the boundary of the menu region 910, the controller can determine that the real coordinates of the pointer are not to be out of the menu region.

For another example, as illustrated in (b) of FIG. 15, when the real coordinates 1420 is close to the boundary of the menu region 910, the controller can determine that the real coordinates of the pointer 1410 are to be out of the menu region 910.

In addition, when it is determined that the real coordinates of the pointer 1410 are to be out of the menu region, the controller can display the menu 715, in which the pointer 1410 is positioned, by changing the position of the menu 715, as illustrated in (b) of FIG. 15.

The following description will be made with reference to FIGS. 16 and 17 regarding a manner of warning that the pointer is out of the menu region by displaying and changing a pointer 1410.

When the real coordinates of the pointer are to be out of the menu area 910, the controller can change and display the shape of the pointer 1410.

In detail, the controller can determine whether the real coordinates 1420 of the pointer 1410 are to be out of the menu region 910.

(a) of FIG. 16 illustrates that real coordinates 1420 of the pointer are not to be out of the menu region 910, and (b) of FIG. 16 illustrates that the real coordinates 1420 of the pointer are to be out of the menu region.

In addition, when it is determined that the real coordinates of the pointer are to be out of the menu region, the controller can display the pointer 1410 by tilting the pointer 1410, as illustrated (b) of FIG. 16.

Meanwhile, the pointer 1410 can be a three-dimensional image. When it is determined that the real coordinates 1420 of the pointer 1410 are to be out of the menu region 910, the controller can display an effect in which the three-dimensional image is tilted.

When the real coordinates 1420 of the pointer 1410 are to be out of the menu area 910, the controller can change and display the position of the pointer 1410.

In detail, the controller can determine whether the real coordinates 1420 of the pointer 1410 are to be out of the menu region 910.

(a) of FIG. 17 illustrates that real coordinates 1420 of the pointer 1410 are not to be out of the menu region 910, and (b) of FIG. 17 illustrates that the real coordinates 1420 of the pointer are to be out of the menu region 910.

In addition, when it is determined that the real coordinates 1420 of the pointer 1410 are to be out of the menu region 910, the controller can display the pointer 1410 by changing the position of the pointer 1410, as illustrated in (b) of FIG. 17.

In this case, the changed position of the pointer 1410 can be positioned higher than a position, which is not changed, of the pointer 1410. In other words, the pointer 1410, which moves in the horizontal direction, moves up, thereby clearly transmitting a warning to a user.

Figure 18A:
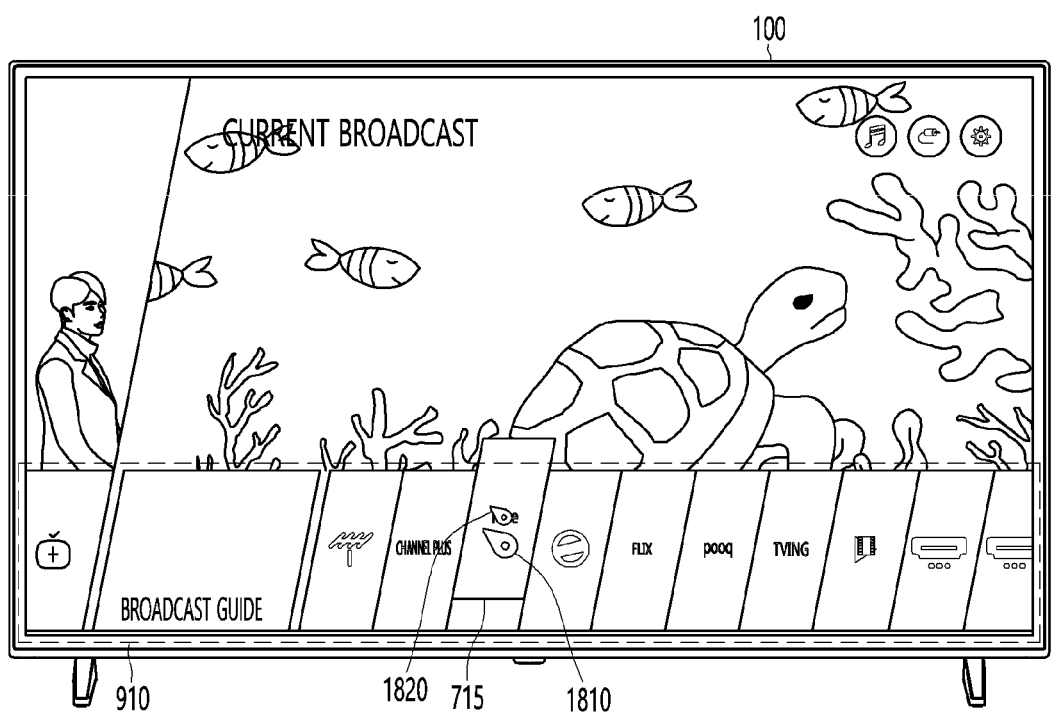
FIGS. 18A to 18C illustrate a manner for warning the deviation of a pointer by displaying a second pointer corresponding to real coordinates.
Figure 18B:
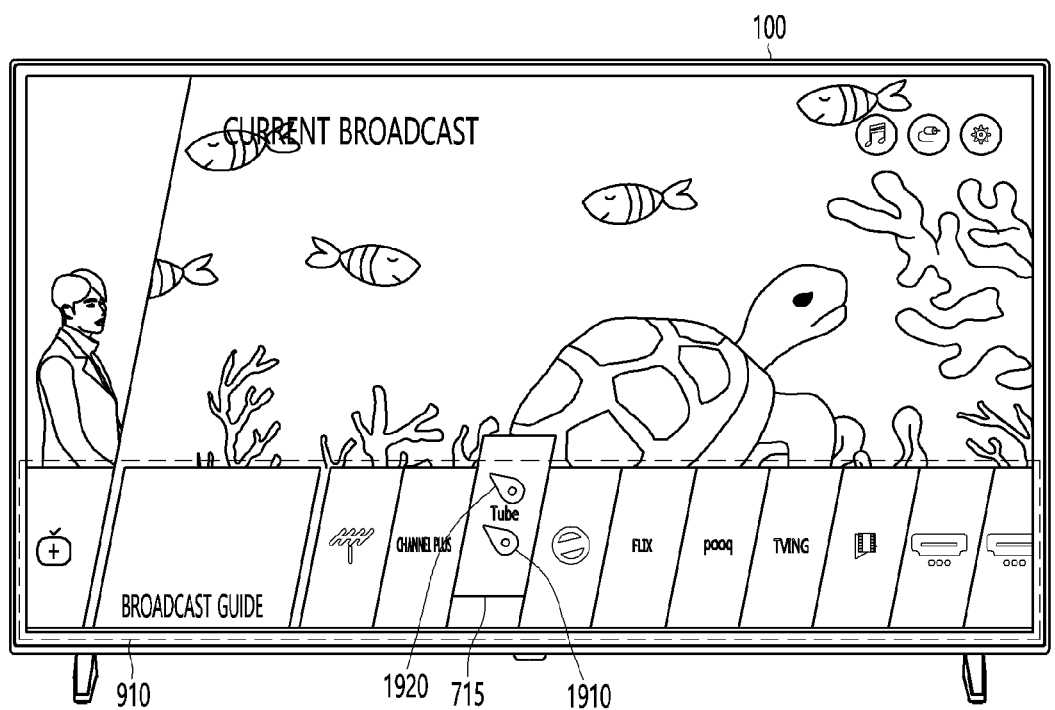
Figure 18C:
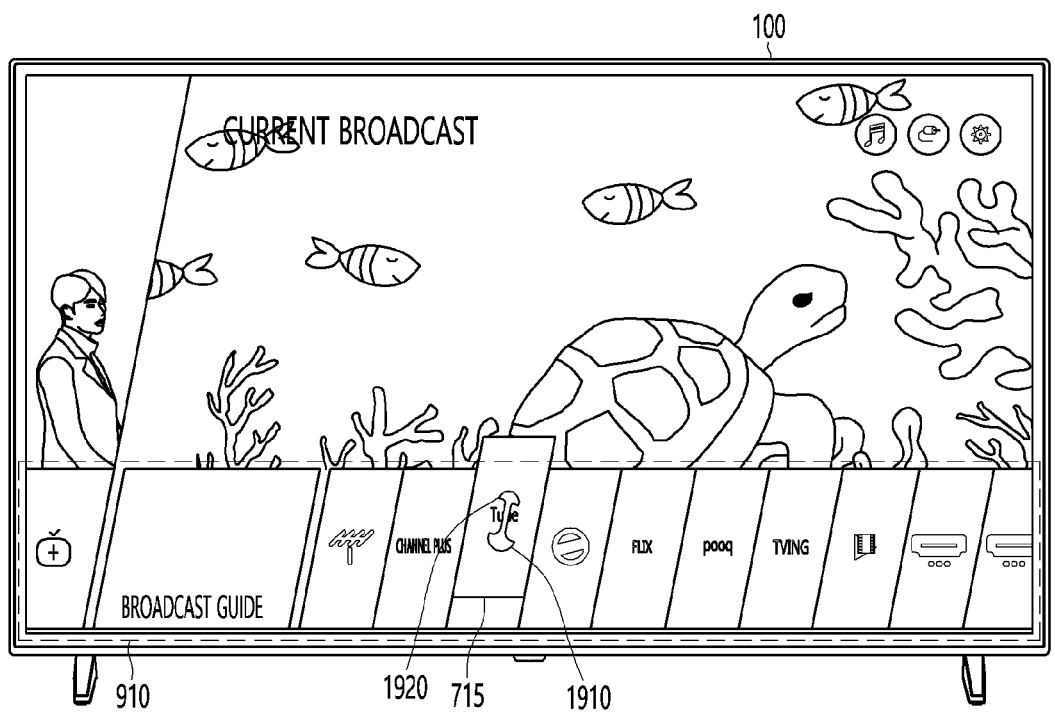

FIGS. 18A-18C illustrate a manner for warning the deviation of a pointer by displaying a second pointer corresponding to real coordinates.

As illustrated in FIG. 18A, the controller can display, together with a pointer 1810, a second pointer 1820 matched to the real coordinates.

In this case, differently from the pointer 1810 displayed at correction coordinates, the second pointer 1820 can be displayed at the real coordinates of the pointer.

Meanwhile, the second pointer 1820 can be displayed in size or color different from that of the pointer 1810.

For example, the pointer 1810 is in chromatic color, while the second pointer 1820 can be in high-brightness achromatic color or low-brightness achromatic color.

Meanwhile, the realization can be possible in a scheme of displaying the second pointer 1820 only when the real coordinates of the pointer are to be out of the menu region 910.

In detail, as illustrated in FIG. 18B, when the real coordinates of the pointer 1910 are close to the boundary of the menu region 910, the controller can determine that the real coordinates of the pointer 1910 are to be out of the menu region 910.

When the real coordinates of the pointer 1910 are to be out of the menu region 910, the controller can display, together with a pointer 1910, a second pointer 1920 matched to the real coordinates of the pointer.

In this case, the controller can display the second pointer 1920 using an elastic effect as illustrated in FIG. 18C.

As described above, according to the present disclosure, the deviation of the pointer is warned to a user through various manners, thereby preventing the pointer from being out of the menu region 910, as the real coordinates of the pointer are out of the menu region 910.

FIGS. 19 and 20 are views illustrating manner for moving a pointer depending on a pointer moving mode, according to an embodiment of the present disclosure.

The pointer moving mode can include a first mode and a second mode.

In this case, the first mode and the second mode can be determined depending on tilting of the remote control device 200

For example, the first mode can be a mode in which the remote control device 200 moves in a first tilting state as illustrated in (b) of FIG. 19.

In addition, for another example, the second mode can be a mode in which the remote control device 200 moves in a second tilting state as illustrated in (b) of FIG. 20.

In this case, the user input interface can receive a user input to move a pointer and mode information of a remote control device.

In detail, in (b) of FIG. 19, the user input interface can receive a signal corresponding to the movement of the remote control device 200 and information that the remote control device 200 is in the first mode, from the remote control device 200.

In detail, in (b) of FIG. 20, the user input interface can receive a signal corresponding to the movement of the remote control device 200 and information that the remote control device 200 is in the second mode, from the remote control device 200.

Meanwhile, as illustrated in (a) of FIG. 19, the controller can move the pointer 1910 in the moving direction 1920 of the real coordinates, in the first mode.

In addition, as illustrated in (a) of FIG. 20, the controller can move the pointer 1910 while fixing the pointer 1910 in a specific direction, regardless of the moving direction 1920 of the real coordinates, in the second mode.

As described above, according to the present disclosure, the manner for moving the pointer can be changed by simply changing a manner in which a user holds the remote control device 200.

FIGS. 21 to 37 are views illustrating a magnetic effect of attracting a pointer, according to an embodiment of the present disclosure.

FIG. 21 is a view illustrating a manner for attracting a pointer, according to an embodiment of the present disclosure.

The screen can include a magnetic region 2110.

In this case, the magnetic region 2110 can include the menu region 910. In this case, the size of the magnetic region 2110 can be greater than the size of the menu region 910.

In this case, the magnetic region 2110 can be a region allowing the pointer to move into the menu region 910 without a user input to move the pointer.

In detail, as illustrated in (a) of FIG. 21, when a pointer 2120 enters the magnetic region 2110 including the menu region 910, the controller can move the pointer 2120 into the menu region 910 and display the pointer 2120.

In more detail, as illustrated in (a) of FIG. 21, when a pointer 2120 enters the magnetic region 2110 including the menu region 910, the controller can move the pointer 2120 into the menu region 910 and display the pointer 2120, without the user input to move the pointer.

Meanwhile, as illustrated in (b) of FIG. 21, the controller can move the pointer 2120, which has entered the magnetic region 2110, into the menu region 910 and can display the pointer 2120 at a new position.

Meanwhile, when an input to select a menu, in which a pointer 2130 is positioned, is received, the controller can perform a function corresponding to the selected menu.

FIG. 22 is a view illustrating a manner of attracting a pointer to a button, according to another embodiment of the present disclosure.

The controller can display a button 2211 which is to perform a specific function when selected.

Meanwhile, a second magnetic region 2210 can include the button 2211. In this case, the size of the second magnetic region 2210 can be greater than the size of the button 2211.

As illustrated in (a) of FIG. 22, when a pointer 2220 enters a second magnetic region 2210 including the button 2211, the controller can move the pointer 2220 into the button 2211 and display the pointer 2220.

In other words, when the pointer 2220 enters the second magnetic region 2210 including the button 2211, the controller can move the pointer 2220 into the button 2211 and can display the pointer 2220, without a user input.

Meanwhile, as illustrated in (b) of FIG. 22, the controller can move the pointer 2230, which has entered the second magnetic region 2210, into the menu region 2211 and can display the pointer 2230 at a new position.

Meanwhile, when an input to select the button 2211, in which a pointer 2250 is positioned, is received, the controller can perform a function corresponding to the button 2211.

Meanwhile, the controller can determine whether the magnetic region is activated, depending on the moving mode of the pointer.

In detail, in the first mode, the controller can deactivate the magnetic region. In this case, even though the pointer 2230 has entered the second magnetic region 2210 including the button 2211, when a user input to move the pointer 2230 to the button 2211 is received, the pointer 2230 can move to the button 2211.

In detail, in the second mode, the controller can activate the magnetic region. In other words, when the pointer 2230 enters the second magnetic region 2210 including the button 2211, the controller can move the pointer 2230 to the button 2211 and can display the pointer 2220.

As described above, according to the present disclosure, under a control environment of employing the movement of the remote control device 200, there can be provided an environment in which a user is able to easily select a menu or a button.

Figure 23:
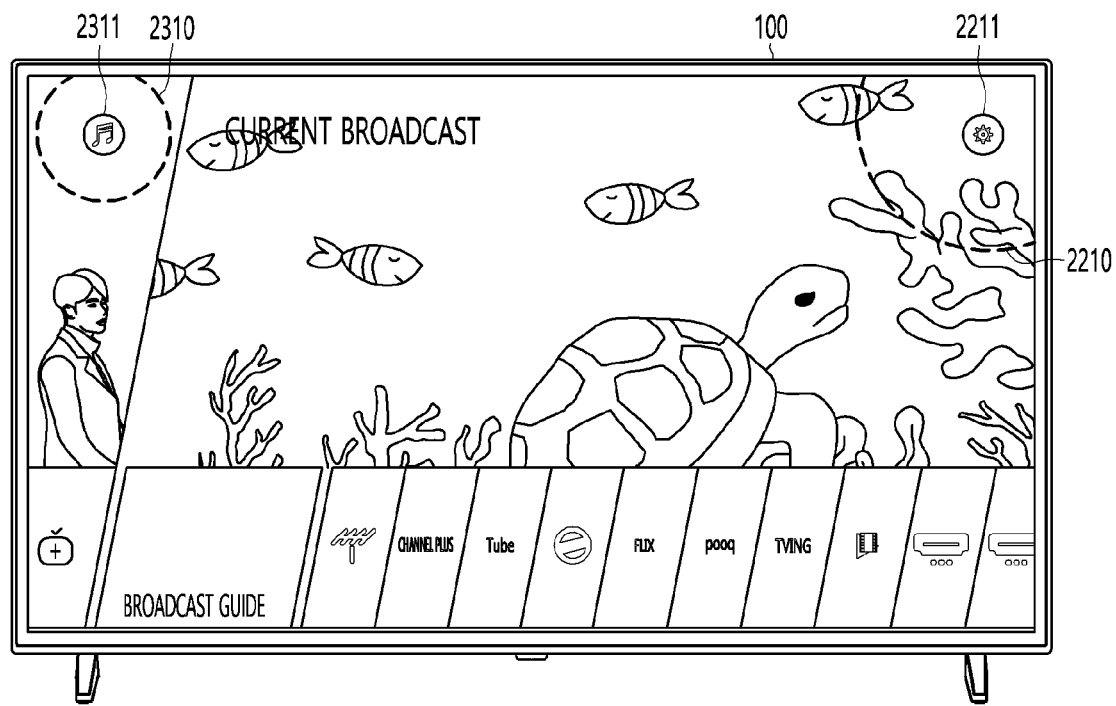
FIG. 23 is a view illustrating the size of a magnetic region.

FIG. 23 is a view illustrating the size of a magnetic region.

The size of the magnetic region can be determined based on at least one of an importance or a use frequency of a button.

In detail, the controller can display a first button 2211, which is to perform a first function when selected, and a second button 2311 which is to perform a second function when selected.

Meanwhile, the first magnetic region 2210 can include the first button 2211. In this case, the size of the first magnetic region 2210 can be greater than the size of the button 2211.

Meanwhile, a second magnetic region 2310 can include a second button 2311. In this case, the size of the second magnetic region 2310 can be greater than the size of the second button 2311.

Meanwhile, the size of the first magnetic region 2210 can be determined based on at least one of an importance or a use frequency of the first button 2211.

Meanwhile, the size of the second magnetic region 2310 can be determined based on at least one of an importance (e.g., predetermined importance value) or a use frequency of the second button 2311.

For example, when the importance of the first button 2211 is higher than that of the second button 2311, the size of the first magnetic region 2210 corresponding to the first button 2211 can be greater than the size of the second magnetic region 2310 corresponding to the second button 2311.

For another example, when the use frequency of the first button 2211 is higher than that of the second button 2311, the size of the first magnetic region 2210 corresponding to the first button 2211 can be greater than the size of the second magnetic region 2310 corresponding to the second button 2311.

Figure 24:
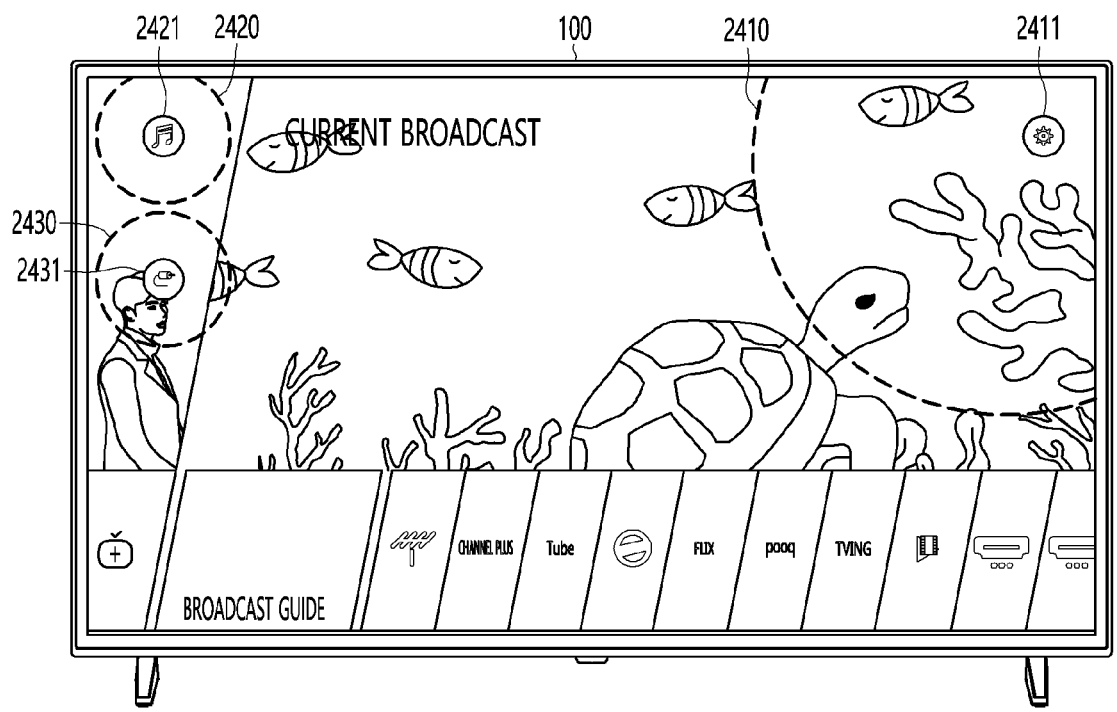
FIG. 24 is a view illustrating the size of a magnetic region, according to another embodiment of the present disclosure.

FIG. 24 is a view illustrating the size of a magnetic region, according to another embodiment of the present disclosure.

The size of the magnetic region can be determined based on a distance from another button.

In detail, the controller can display a first button 2411, which is to perform a first function when selected, a second button 2421, which is to perform a second function when selected, and a third button 2431 which is to perform a third function when selected.

Meanwhile, the first magnetic region 2410 can include the first button 2411.

In addition, a second magnetic region 2420 can include a second button 2421.

Further, a third magnetic region 2430 can include a third button 2431.

Meanwhile, the size of the first magnetic region 2410 can be determined based on a distance between the first button 2411 and another button. Meanwhile, the size of the second magnetic region 2420 can be determined based on a distance between the second button 2421 and another button.

In detail, the distance between the first button 2411 and the second button 2421, or the distance between the first button 2411 and the third button 2431 can be longer than the distance between the second button 2421 and the third button 2431.

In this case, the size of the first magnetic region 2410 corresponding to the first button 2411 can be greater than the size of the second magnetic region 2420 corresponding to the second button 2421.

Figure 25:
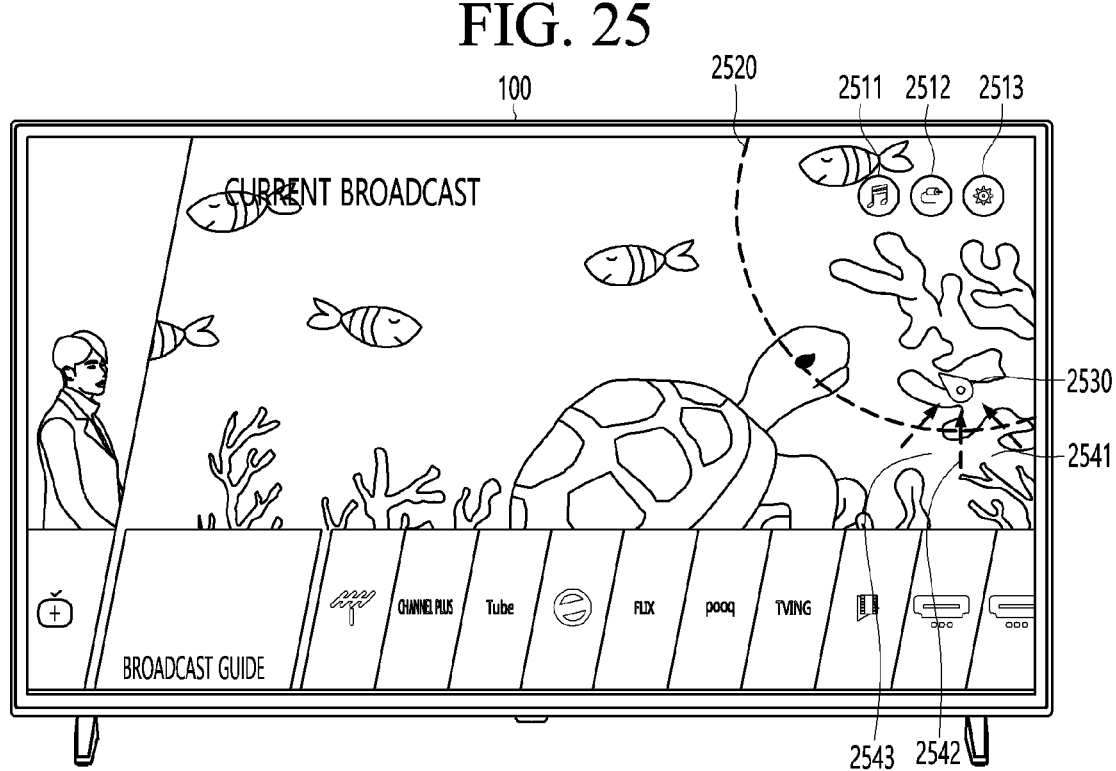
FIG. 25 is a view illustrating a magnetic region including a plurality of buttons, according to an embodiment of the present disclosure.

FIG. 25 is a view illustrating a magnetic region including a plurality of buttons, according to an embodiment of the present disclosure.

Although a plurality of buttons 2511, 2512, and 2513 can have relevant magnetic regions, respectively, the plurality of buttons 2511, 2512, and 2513 can have one magnetic region 2520.

In addition, when a pointer 2530 enters the magnetic region 2520 including the plurality of buttons 2511, 2512, and 2513, the controller can move the pointer 2530 to any one of the plurality of buttons 2511, 2512, and 2513 and can display the pointer 2530.

In this case, the controller can move the pointer 2530 to any one of the plurality of buttons 2511, 2512, and 2513 and can display the pointer 2530, based on a forward direction of the pointer.

In detail, when the forward direction of the pointer 2530 is a first direction 2541, the controller can move the pointer 2530 to the first button 2511 positioned in the first direction 2541 and display the pointer 2530.

In addition, when the forward direction of the pointer 2530 is a second direction 2542, the controller can move the pointer 2530 to the second button 2512 positioned in the second direction 2542 and display the pointer 2530.

Figure 26:
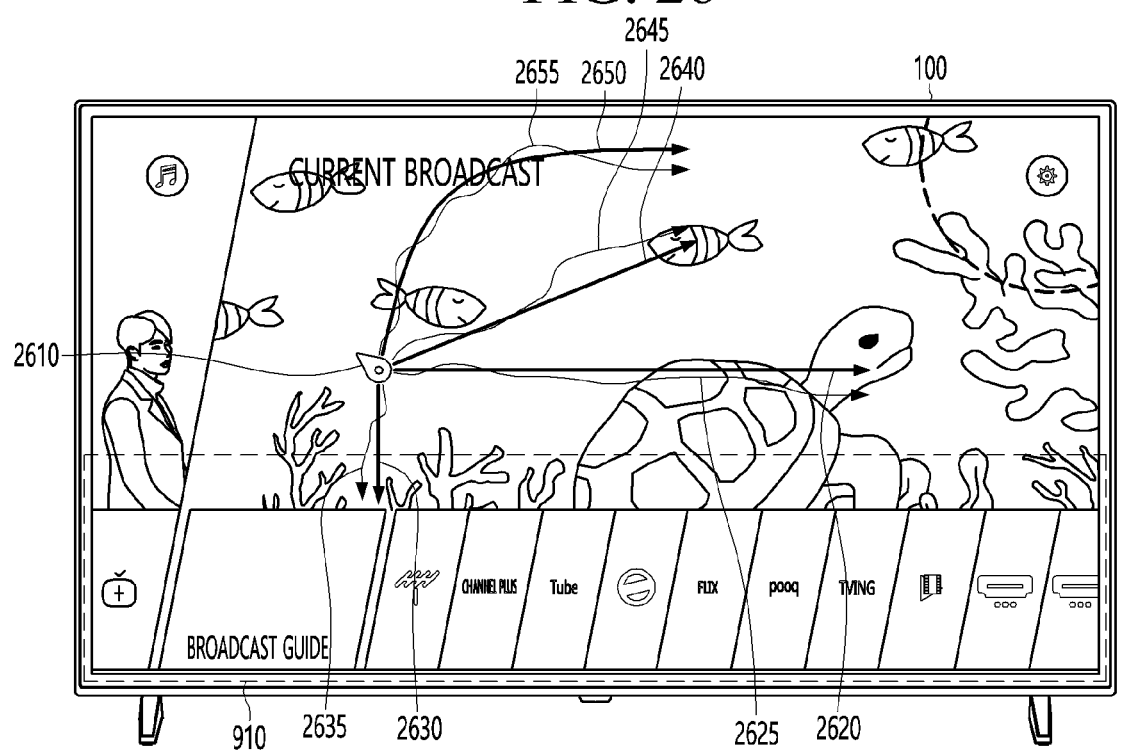
FIG. 26 is a view illustrating a manner for moving a pointer out of a menu region or a magnetic region, according to an embodiment of the present disclosure.

FIG. 26 is a view illustrating a manner for moving a pointer out of a menu region 910 or a magnetic region, according to an embodiment of the present disclosure.

The controller can move a pointer 2610 based on a user input to move the pointer 2610.

In this case, the controller can correct the moving path of the pointer 2610.

In detail, the controller can determine a main direction of the user input, based on a signal corresponding to the movement of the remote control device 200.

For example, the controller can determine whether the user input is for up-down movement, left-right movement, or diagonal movement, based on a signal corresponding to the movement of the remote control device 200.

In this case, the controller can move the pointer 2610 according to corrected moving paths 2630, 2620, 2640, and 2650, instead of moving paths 2625, 2635, 2645, and 2655 corresponding to the real coordinates of the pointer.

Meanwhile, the controller can determine the moving path of the pointer depending on the pointer moving mode.

In detail, in the first mode, the controller can move the pointer to the moving paths 2625, 2635, 2645, and 2655 corresponding to the real coordinates of the pointer.

In addition, in the second mode, the controller can move the pointer along the corrected moving paths 2630, 2620, 2640, and 2650.

Figure 27:
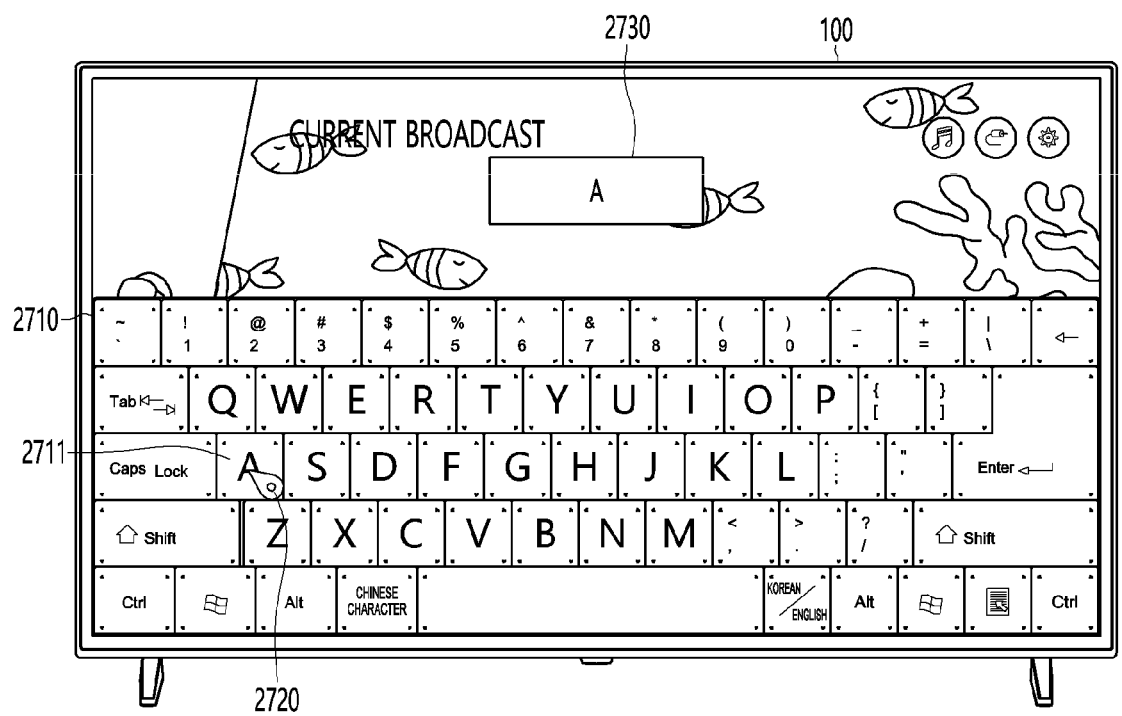
FIG. 27 is a view illustrating a keyboard UI, according to an embodiment of the present disclosure.

FIG. 27 is a view illustrating a keyboard UI, according to an embodiment of the present disclosure.

Referring to FIG. 27, the controller can display the keyboard UI 2710 for inputting a text (a character, a number, or a special symbol).

Meanwhile, the controller can receive an input to select a specific character 2711 by the pointer 2720. In addition, when the input to select the specific character 2711 is received, the controller can display the specific character on an input window 2730.

Figure 28:
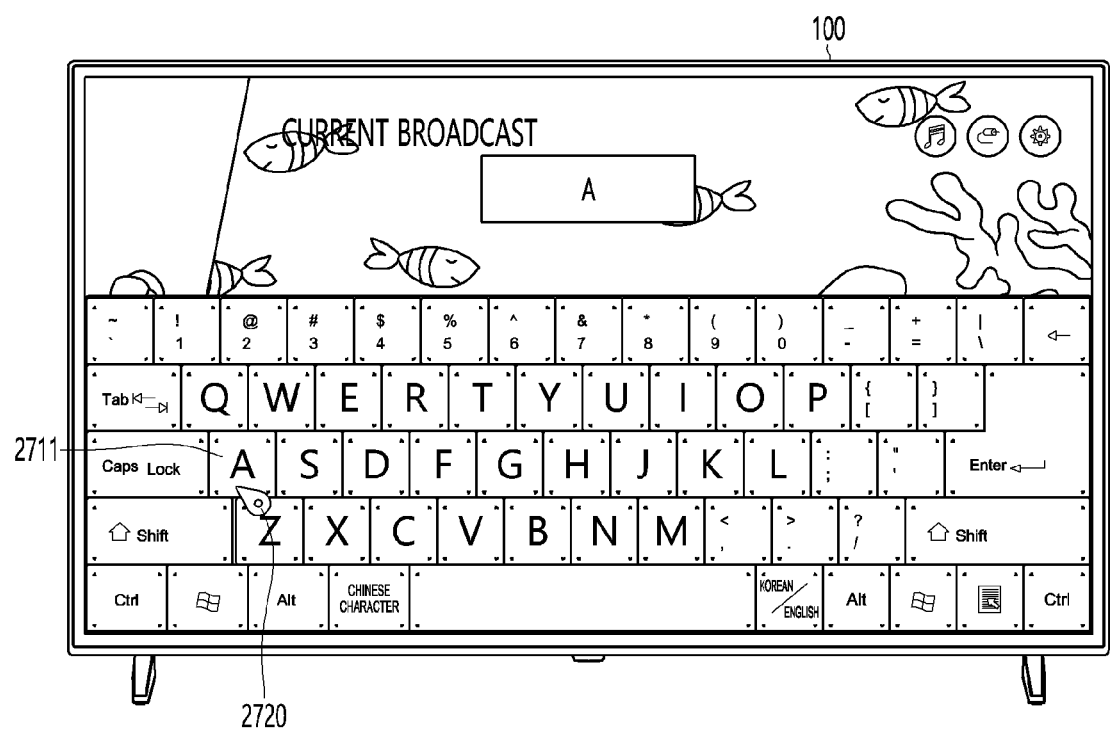
FIG. 28 is a view illustrating a position at which a pointer is displayed, according to an embodiment of the present disclosure.

FIG. 28 is a view illustrating a position of displaying a pointer, according to an embodiment of the present disclosure.

When the pointer is moved to select a specific character 2711, the controller can display a pointer 2720 such that the specific character 2711 is not hidden by the pointer 2720.

For example, the controller can display the pointer under the specific character 2711 even if real coordinates of the pointer are positioned at a point in which the specific character 2711 is displayed.

Figure 29:
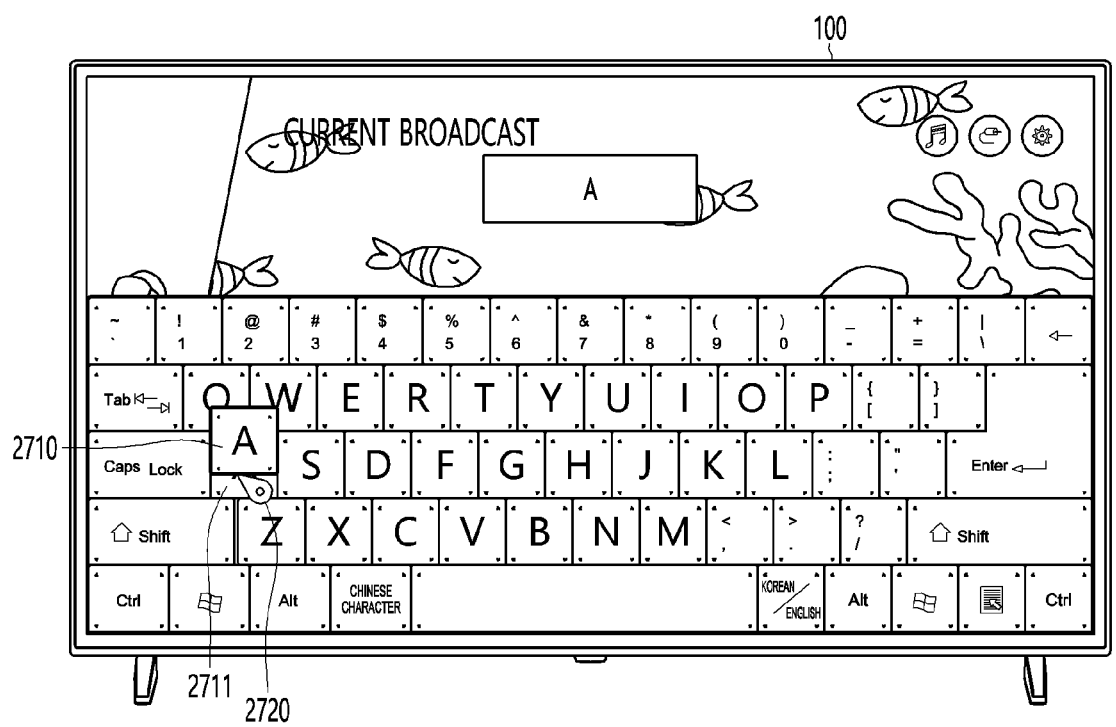
FIG. 29 is a view illustrating a method of displaying the specific character 2711 as a pointer moves, according to an embodiment of the present disclosure.

FIG. 29 is a view illustrating a manner of displaying the specific character 2711 as a pointer moves, according to an embodiment of the present disclosure.

When moving the pointer 2720 to select the specific character 2711, the controller can display an icon 2710 including the specific character 2711.

For example, when the real coordinates of the pointer 2720 are positioned at a point in which the specific character 2711 is displayed, the controller can display the icon 2710 including the specific character 2711, on the keyboard UI.

In this case, the icon 2710 including the specific character 2711 can be displayed without being overlapped with the pointer 2720, or displayed on the pointer 2720 to hide a portion or an entire portion of the pointer 2720.

Figure 30:
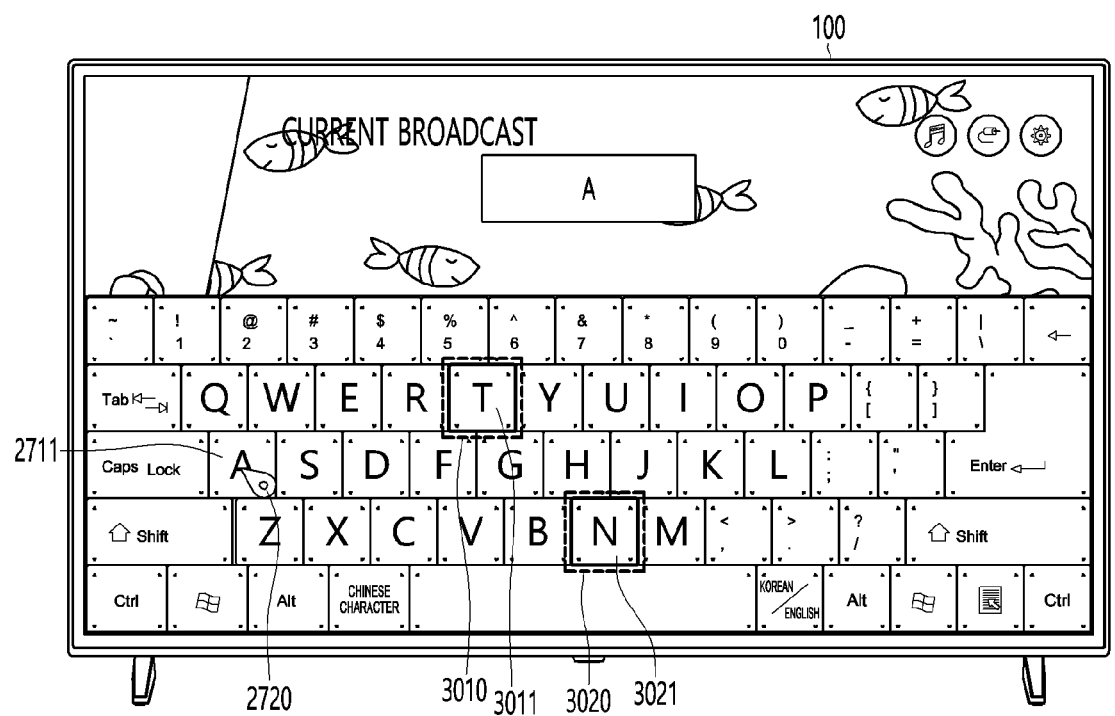
FIG. 30 is a view illustrating a manner for determining a next character and a manner for setting a magnetic region, based on a contextual probability, according to an embodiment of the present disclosure.

FIG. 30 is a view illustrating a manner for determining a next character and a manner for setting a magnetic region, based on a contextual probability, according to an embodiment of the present disclosure.

The contextual probability can refer to the probability in which an arbitrary characteristic comes next to a specific character, when the specific character is selected. The contextual probability can be determined depending on the importance of each of a plurality of words including the specific character, the use frequency of each of the plurality of words including the specific character, or the frequency in which the specific text is combined with the next character.

When an input to select the specific character 2711 is received, the controller can determine a priority of a character to come next to the specific character 2711, based on the contextual probability.

For example, when an input to select a character "A" is received, the controller can determine a character "T" as a character, which has a first priority, to come next to the character "A", and determine a character "N" as a character, which has a second priority, to come next to the character "A".

In addition, the controller can display a first button 3011 indicating a first character associated with a specific character and a second button 3021 indicating a second character associated with a specific character. In this case, the character associated with the specific character can refer to a character, which has a higher priority, to come next to the specific character 2711 of a plurality of characters.

Meanwhile, the controller can set a first magnetic region 3010 including the first button 3011 and a second magnetic region 3020 including the second button 3021.

In addition, when the pointer enters the first magnetic region 3010 including the first button 3011, the controller can move the pointer to the first button and display the pointer.

In addition, when the pointer 2720 enters the second magnetic region 3020 including the second button 3021, the controller can move the pointer 2720 to the second button and display the pointer.

Meanwhile, the sizes of the first magnetic region 3010 and the second magnetic region 3020 can be determined according to contextual probability.

In detail, when the priority of the first character is higher than that of the second character as the first character is higher than the second character in contextual probability, the size of the first magnetic region corresponding to the first character can be greater than the size of the second magnetic region corresponding to the second character.

Figure 31:
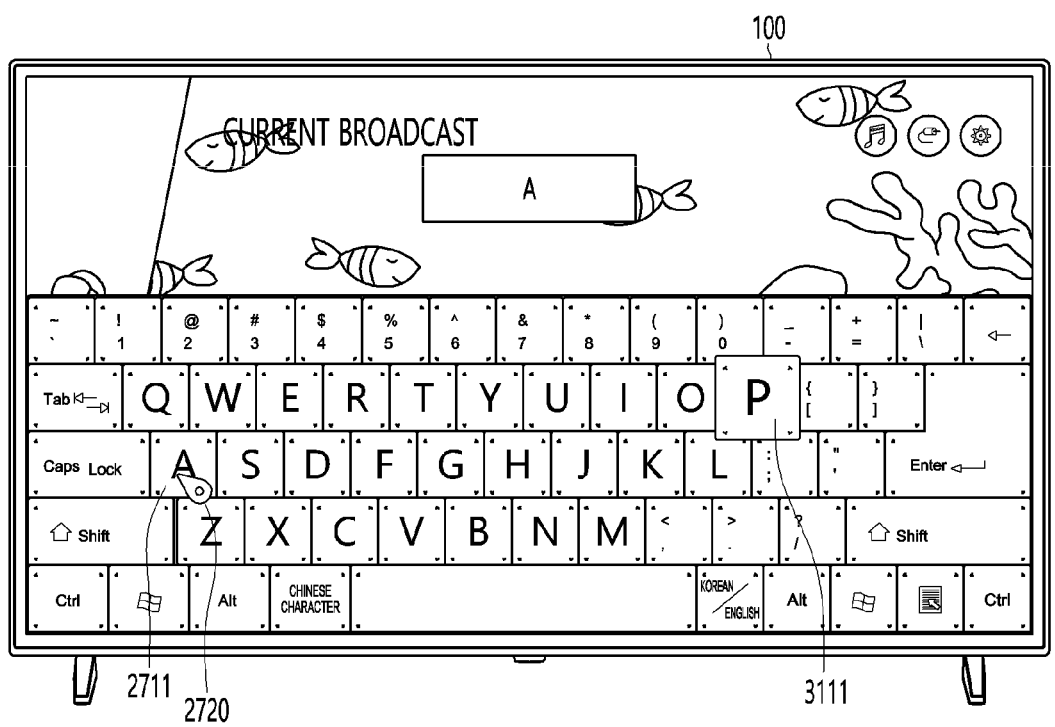
FIG. 31 is a view illustrating a manner for displaying a next character, based on a contextual probability, according to an embodiment of the present disclosure.

FIG. 31 is a view illustrating a manner for displaying a next character, based on a contextual probability, according to an embodiment of the present disclosure.

When an input to select the specific character 2711 is received, the controller can determine a priority of a character to come next to the specific character 2711, based on the contextual probability.

In addition, the controller can display the first button 3111 indicating the first character associated with the specific character such that the first button 3111 is identified.

In detail, the controller can enlarge and display the first button 3111 indicating the first character associated with the specific character.

Figure 32:
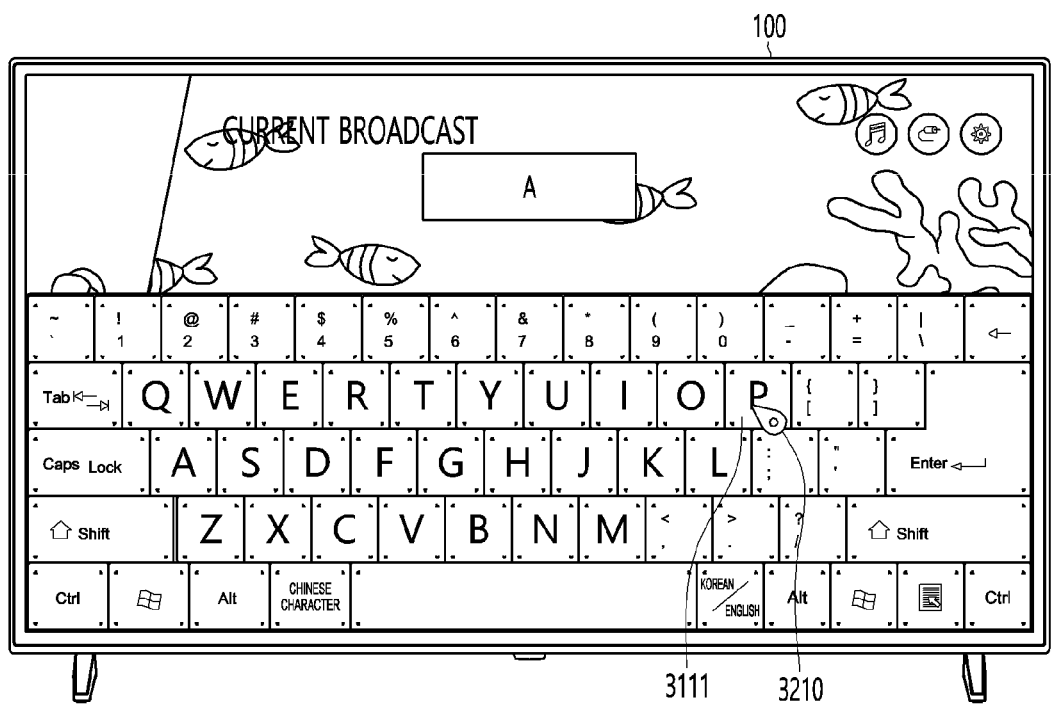
FIG. 32 is a view illustrating a manner for moving a pointer to a next character, based on a contextual probability, according to an embodiment of the present disclosure.

FIG. 32 is a view illustrating a manner for moving a pointer to a next character, based on a contextual probability, according to an embodiment of the present disclosure.

When an input to select the specific character 2711 is received, the controller can determine a priority of a character to come next to the specific character 2711, based on the contextual probability.

In addition, the controller can display a pointer 3210 on a first button 3111 indicating a first character associated with the specific character.

Figure 33:
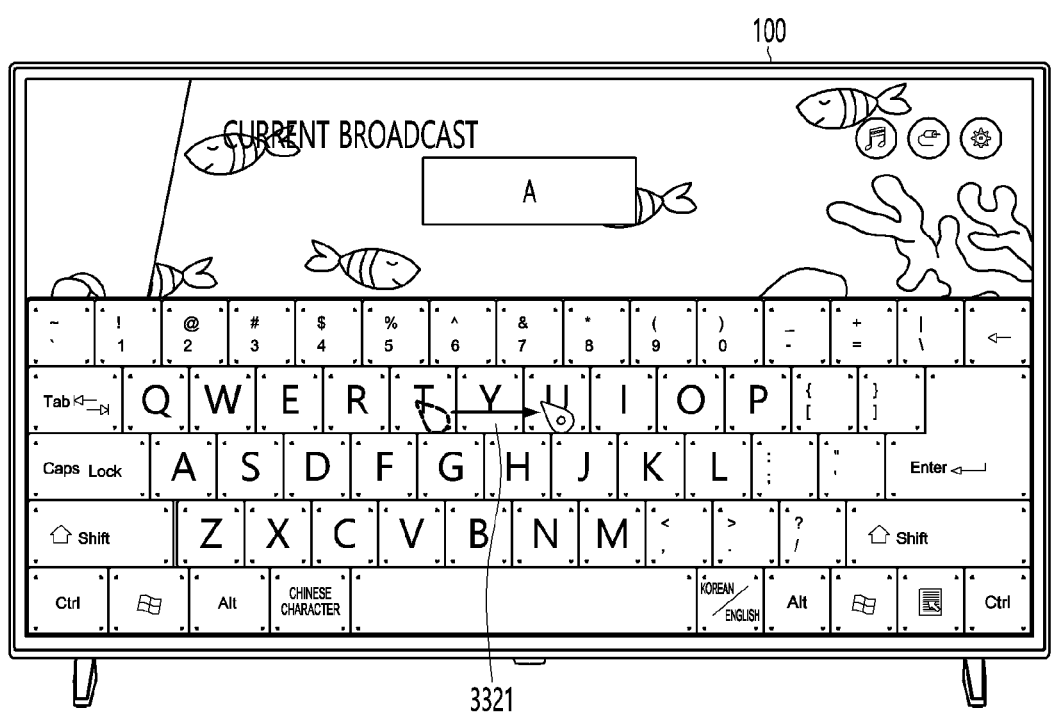
FIG. 33 is a view illustrating a manner for moving a pointer, based on a contextual probability, according to an embodiment of the present disclosure.

FIG. 33 is a view illustrating a manner for moving a pointer, based on a contextual probability, according to an embodiment of the present disclosure.

When an input to select the specific character 2711 is received, the controller can determine a priority of a character to come next to the specific character 2711, based on the contextual probability.

Meanwhile, the controller can receive an input to move the pointer. In addition, when a text 3321 having a lower priority is positioned on the moving path of the pointer, the controller can display the pointer such that the pointer passes through the character 3321 having the lower priority.

Figure 34:
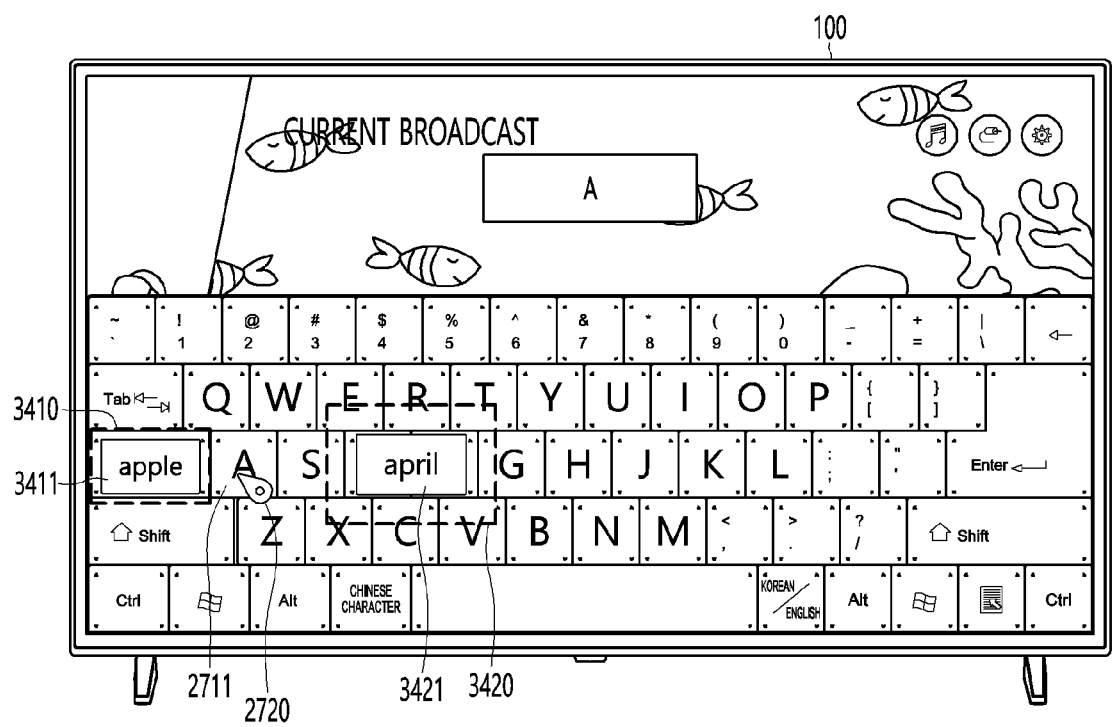
FIG. 34 is a view illustrating a manner for determining an autocomplete word and a manner for setting a magnetic region, based on a contextual probability, according to an embodiment of the present disclosure.

FIG. 34 is a view illustrating a manner for determining an autocomplete word and a manner for setting a magnetic region, based on a contextual probability, according to an embodiment of the present disclosure.

The contextual probability can refer to the probability in which a specific character is completed to a certain word including the specific character, when the specific character is selected. The contextual probability can be determined depending on the importance of each of a plurality of words including the specific character and the use frequency of each of the plurality of words including the specific character.

When an input to select the specific character 2711 is received, the controller can determine a priority of a character including the specific character 2711, based on the contextual probability.

For example, when an input to select a character "A" is received, the controller can determine an autocomplete word having the first priority as "april" and an autocomplete word having the second priority as "apple", based on contextual probability.

In addition, the controller can display a first button 3421 indicating a first autocomplete word associated with a specific character and a second button 3411 indicating a second autocomplete word associated with the specific character. In this case, the autocomplete word associated with the specific character can refer to an autocomplete word, which has a higher priority, of a plurality of autocomplete words including the specific character.

Meanwhile, the controller can set a first magnetic region 3420 including the first button 3421 and a second magnetic region 3410 including the second button 3411.

In addition, when the pointer enters the first magnetic region 3420 including the first button 3421, the controller can move the pointer to the first button 3421 and display the pointer.

In addition, when the pointer enters the second magnetic region 3410 including the second button 3411, the controller can move the pointer to the second button 3411 and display the pointer.

Meanwhile, the sizes of the first magnetic region 3420 and the second magnetic region 3410 can be determined according to contextual probability.

In detail, when the priority of the first autocomplete word is higher than that of the second autocomplete word, as the first autocomplete word is higher than the second autocomplete word in contextual probability, the size of the first magnetic region corresponding to the first autocomplete word can be greater than the size of the second magnetic region corresponding to the second autocomplete word.

Figure 35:
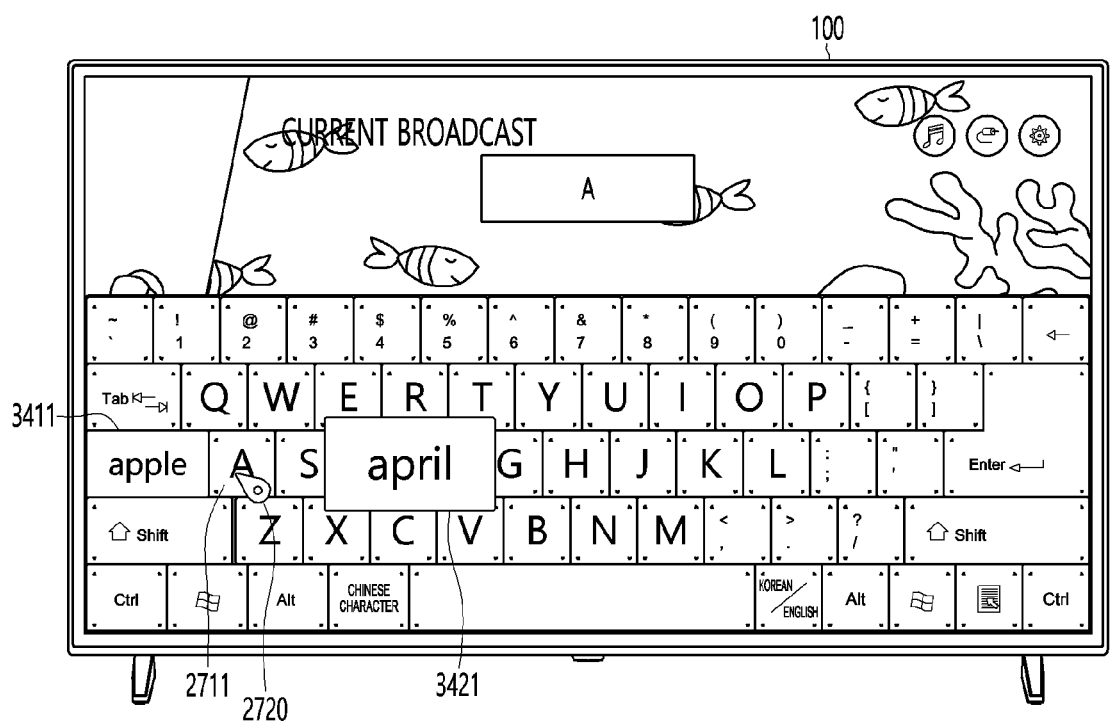
FIG. 35 is a view illustrating a manner for adjusting the size of a button including an autocomplete word based on a contextual probability, according to an embodiment of the present disclosure.

FIG. 35 is a view illustrating a manner for adjusting the size of a button including an autocomplete word based on a contextual probability, according to an embodiment of the present disclosure.

When an input to select the specific character 2711 is received, the controller can determine a priority of an autocomplete word including the specific character 2711, based on the contextual probability.

In addition, the controller can display a first button 3421 indicating a first autocomplete word associated with a specific character and a second button 3411 indicating a second autocomplete word associated with the specific character.

Meanwhile, the sizes of the first button 3421 and the second button 3411 can be determined according to contextual probability.

In detail, when the priority of the first autocomplete word is higher than that of the second autocomplete word, as the first autocomplete word is higher than the second autocomplete word in contextual probability, the size of the first button 3421 corresponding to the first autocomplete word can be greater than the size of the second button 3411 corresponding to the second autocomplete word.

Alternatively, the size of the first autocomplete word included in the first button 3421 and the size of the second autocomplete word included in the second button 3411 can be determined according to contextual probability.

In detail, when the priority of the first autocomplete word is higher than that of the second autocomplete word, as the first autocomplete word is higher than the second autocomplete word in contextual probability, the size of the first autocomplete word included in the first button 3411 can be greater than the size of the second autocomplete word included in the second button 3411.

Meanwhile, the controller can determine whether to display a character associated with a specific character or an autocomplete word associated with the specific character, depending on the pointer moving mode.

In detail, when an input to select a specific character is received in the first mode, the controller can display a button including a character associated with the specific character.

To the contrary, when an input to select a specific character is received in the second mode, the controller can display a button including an autocomplete word associated with the specific character.

Figure 36A:
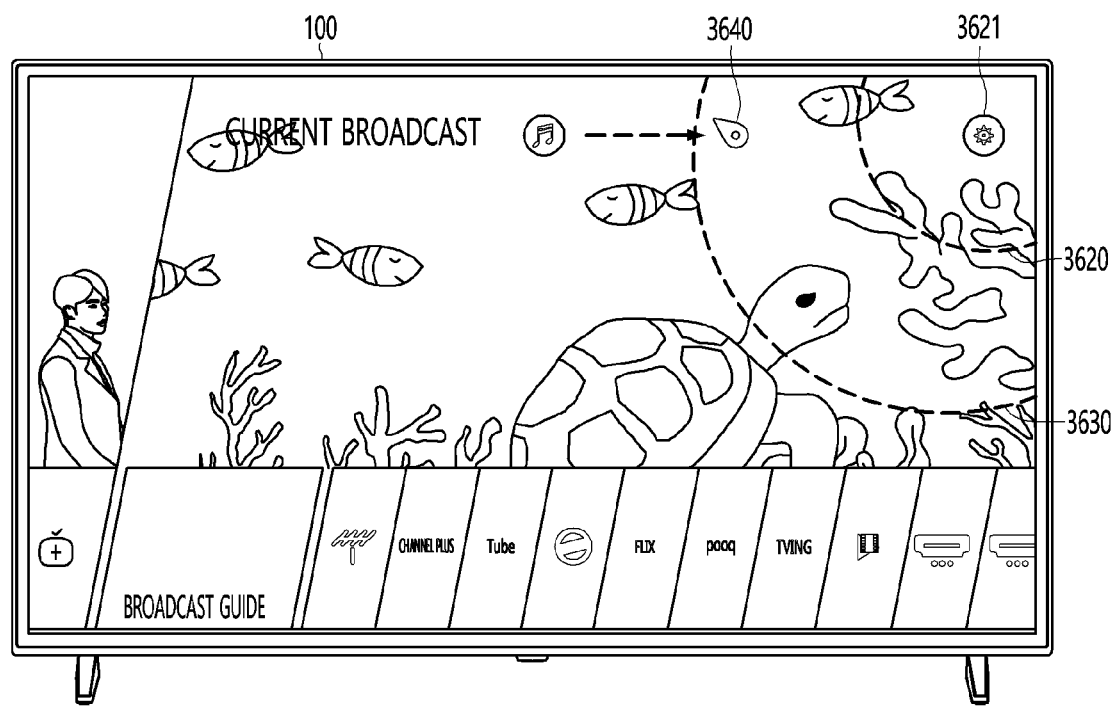
FIGS. 36A to 36C are views illustrating a position at which a pointer is displayed, according to an embodiment of the present disclosure.
Figure 36B:
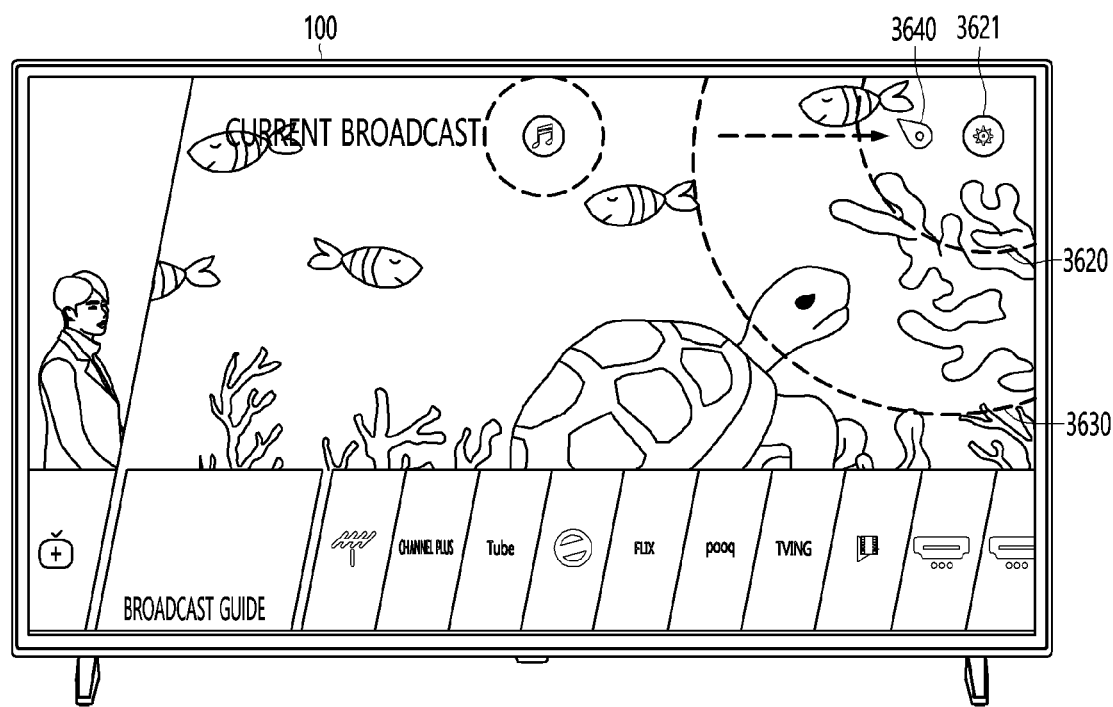

FIGS. 36A and 36B are views illustrating an acceleration region, according to an embodiment of the present disclosure.

A screen can include an acceleration region. In this case, the acceleration region 3630 can include a button 3621. In this case, the size of the acceleration region 3630 can be greater than the size of the button 3621.

In this case, the acceleration region 3630 can include a magnetic region 3620. In this case, the size of the acceleration region 3630 can be greater than the size of the magnetic region 3620.

Meanwhile, as illustrated in FIG. 36A, when a pointer 3640 enters the acceleration region 3630, and when the moving direction of the pointer 3640 is a direction in which the button 3621 is positioned, the controller can increase the moving speed of the pointer 3640.

In this case, the controller can continuously apply an acceleration to the pointer 3640. In other words, as the acceleration of the pointer 3640 is continuously applied, the moving speed of the pointer 3640 can be gradually increased.

Figure 36C:
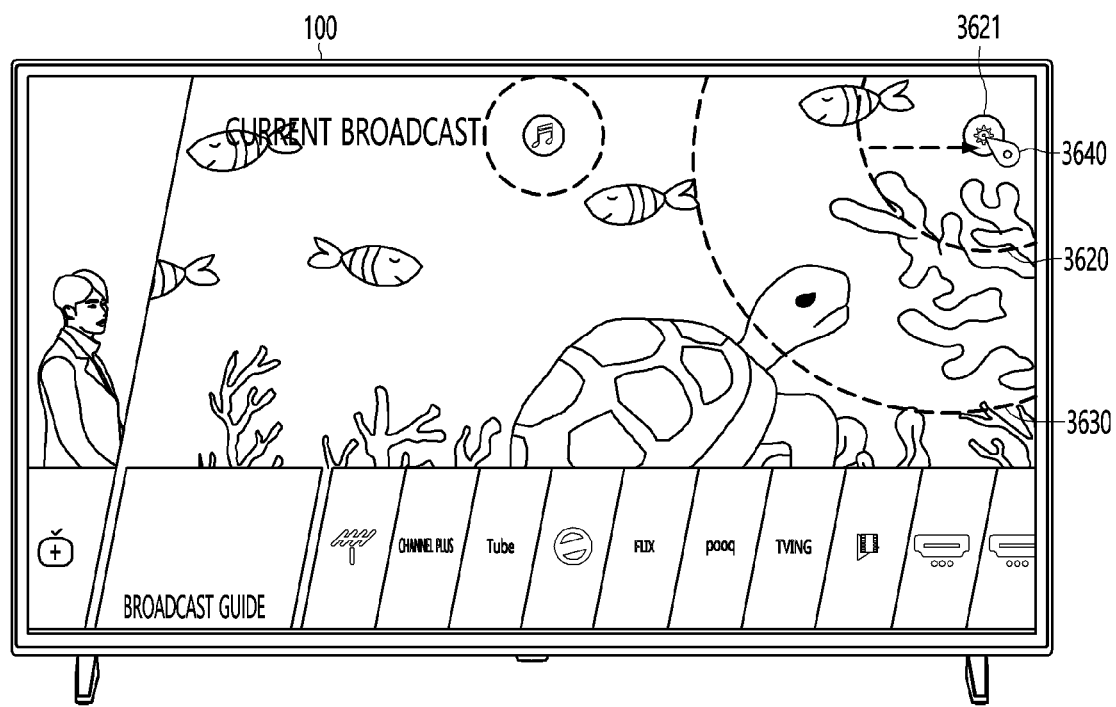

Meanwhile, as illustrated in FIG. 36B, when the pointer 3640 enters the magnetic region 3620, the controller can move the pointer 3640 to the button 3621 and display the pointer 3640 as illustrated in FIG. 36C.

Meanwhile, the size of the acceleration region can be determined based on a distance between the button 3621 and another button.

In detail, when the distance between the button 3621 and another button is long, the acceleration region 3630 can have a larger size.

In other words, as the distance between the button 3621 and another button becomes longer, it takes a large amount of time to move the pointer. Therefore, according to the present disclosure, the size of the acceleration region is adjusted based on the distance from another button to rapidly move the pointer.

Meanwhile, the controller can display or may not display the boundary of the magnetic region or the boundary of the acceleration region. When the boundary is not displayed, the screen can be prevented from becoming complex. When the boundary is displayed, the user can detect the position of the boundary and control the pointer.

Meanwhile, the controller is a typical component to control an apparatus, and the term "controller" can be used interchangeably with the term "central processing unit", "micro-processor", or "processor".

The present disclosure can be embodied as computer-readable codes on a program-recorded medium. The computer-readable recording medium can be any recording medium that stores data which can be thereafter read by a computer system. Examples of the computer-readable medium can include hard disk drive (HDD), solid state disk (SSD), silicon disk drive (SDD), read-only memory (ROM), random-access memory (RAM), CD-ROM, a magnetic tape, a floppy disk, and an optical data storage device. In addition, the computer can include the controller 170 of the display device 100. Accordingly, the above detailed description should not be construed as being restrictive in all respects and should be considered illustrative. The scope of the present specification should be determined by rational interpretation of the appended claims, and all changes within the equivalent scope of the present specification fall within the scope of the present specification.

The invention claimed is:

1. A television, comprising:
a tuner configured to receive a display signal;
a display; a user input interface configured to receive a user input to move a cursor on the display; and
a controller configured to:
control the display to display contents in a first region of the display,
control the display to display at least a first function button in a second region of the display different than the first region,
in response to the user input moving the cursor in the first region, move the cursor with a first moving speed corresponding to the user input,
in response to the user input moving the cursor in the second region and when the cursor is a first distance from the first function button, move the cursor with a second moving speed toward the first function button, wherein the second moving speed is greater than the first moving speed and is based on the first distance from the cursor to the first function button, and
in response to the user input moving the cursor in the second region and when the cursor is a second distance greater than the first distance from the first function button, move the cursor with a third moving speed toward the first function button, wherein the third moving speed is greater than the second moving speed and is based on the second distance from the cursor to the first function button.

2. The television of claim 1, wherein the controller is further configured to:
display a second function button on the display a predetermined distance from the first function button, and
change an amount of the moving speed of the cursor based on a changed predetermined distance between the first function button and the second function button.

3. The television of claim 2, wherein the controller is further configured to:
  increase the moving speed of the cursor a first amount when the predetermined distance between the first function button and the second function button is a first distance, and
  increase the moving speed of the cursor a second amount greater than the first amount when the predetermined distance between the first function button and the second function button is a second distance greater than the first distance.

4. The television of claim 1, wherein the controller is further configured to:
  display the cursor at a center of the first function button depending on an entry position of the cursor into the second region around the first function button.

5. The television of claim 1, wherein the controller is further configured to:
  display a second function button in in the second region of the display as the first function button.

6. The television of claim 5, wherein the controller is further configured to:
  when the cursor is moving in a first direction toward the first function button, snap display the cursor on the first function button to visually indicate the cursor is being magnetically attracted to the first function button, and
  when the cursor is moving in a second direction toward the second function button, snap display the cursor on the second function button to visually indicate the cursor is being magnetically attracted to the second function button.

7. The television of claim 1, wherein the second and third moving speeds of the cursor correspond to the cursor moving across a greater area of the display without a moving speed of a remote controller used for moving the cursor on the display increasing.

8. The television of claim 1, wherein the controller is further configured to:
  move the cursor to the first function button by fixing a moving direction of the cursor to the first function button even when a direction of entry of the cursor into the second region around the first function button is not toward the first function button.

9. The television of claim 1, wherein the controller further configured to:
  display a second function button on the display, and
  move the cursor away from the second function button in response to the user input moving the cursor from the second function button.

10. The television of claim 1, wherein the controller configured to:
  move the cursor in a specific direction in response to receiving the user input to move the cursor.

11. The television of claim 1, wherein a portion of the first function button is not included in the second region.

12. The television of claim 1, wherein controller is further configured to:
  display the cursor on the first function button when the cursor enters the second region without further user input.

13. The television of claim 1, wherein the controller is further configured to:
  not display a boundary of the second region.

14. The television of claim 1, wherein the controller is further configured to:
  display a second function button a first display distance from the first function button, and
  display a third function button a second display distance from the first function button, and
  wherein the second display distance is greater than the first display distance.

15. The television of claim 14, wherein the controller is further configured to:
  in response to the user input moving the cursor from the first function button to the second function button, move the cursor with a first speed, and
  in response to the user input moving the cursor from the first function button to the third function button, move the cursor with a second speed that is greater than the first speed.

16. The television of claim 1, wherein first function button executes a specific function when the cursor is attached to the first function button and an OK button is selected.

17. The television of claim 1, wherein the controller is further configured to:
  display text indicating a specific function performed by the first function button when the cursor is displayed on the first function button.

18. The television of claim 1, wherein the controller is further configured to:
  adjust the moving speed of the cursor based on a distance between the cursor and the first function button.

19. The television of claim 1, wherein the second region corresponds to an edge region of the display.

20. The television of claim 1, wherein the controller is further configured to move the cursor with the second and third moving speeds toward the first function button without further user input.

21. The television of claim 1, wherein the second moving speed moves the cursor a first greater distance greater than the fixed distance in response to the movement of the user input, and
  wherein the third moving speed moves the cursor a second greater distance greater than the first greater distance.

* * * * *